United States Patent
Yoshinaga et al.

(10) Patent No.: US 8,625,202 B2
(45) Date of Patent: Jan. 7, 2014

(54) ZOOM LENS SYSTEM, LENS BARREL, INTERCHANGEABLE LENS APPARATUS AND CAMERA SYSTEM

(75) Inventors: Shunichiro Yoshinaga, Hyogo (JP); Isamu Izuhara, Osaka (JP); Kyoichi Miyazaki, Osaka (JP); Takuya Imaoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 152 days.

(21) Appl. No.: 13/234,867

(22) Filed: Sep. 16, 2011

(65) Prior Publication Data
US 2012/0105683 A1 May 3, 2012

(30) Foreign Application Priority Data
Sep. 17, 2010 (JP) ................... 2010-208911
Sep. 7, 2011 (JP) ................... 2011-195494

(51) Int. Cl.
*G02B 15/14* (2006.01)
(52) U.S. Cl.
USPC .................. 359/684; 359/676; 359/683
(58) Field of Classification Search
USPC ............................. 359/676, 683, 684
See application file for complete search history.

(56) References Cited

U.S. PATENT DOCUMENTS

| 5,018,843 A | 5/1991 | Inadome et al. |
| 5,517,361 A * | 5/1996 | Inadome et al. ............. 359/684 |
| 2001/0043405 A1 | 11/2001 | Eguchi et al. |
| 2003/0210476 A1 | 11/2003 | Harada |
| 2004/0017605 A1 | 1/2004 | Kasahara et al. |
| 2007/0195425 A1 | 8/2007 | Arai |
| 2009/0207501 A1 | 8/2009 | Yokoyama |

FOREIGN PATENT DOCUMENTS

| JP | 02-256011 A | 10/1990 |
| JP | 2001-281522 A | 10/2001 |
| JP | 2003-322797 A | 11/2003 |
| JP | 2004-004698 A | 1/2004 |
| JP | 2006-300969 A | 11/2006 |
| JP | 2007-093974 A | 4/2007 |
| JP | 2007-219318 A | 8/2007 |
| JP | 2007-240875 A | 9/2007 |
| JP | 2007-298832 A | 11/2007 |
| JP | 2009-163271 A | 7/2009 |
| JP | 2009-198552 A | 9/2009 |

* cited by examiner

*Primary Examiner* — William Choi
(74) *Attorney, Agent, or Firm* — Pearne & Gordon LLP

(57) ABSTRACT

Compact and lightweight zoom lens systems having less aberration fluctuation in association with focusing, lens barrels, interchangeable lens apparatuses, and camera systems are provided. The zoom lens system comprises: a first lens unit having positive optical power; a first focusing lens unit which is located on an image side relative to the first lens unit, has negative optical power, and moves along an optical axis in zooming and focusing; and a second focusing lens unit which is located on the image side relative to the first focusing lens unit, has positive optical power, and moves along the optical axis in the zooming and the focusing, and satisfies the condition: $|d_{2T}/d_{1T}|<1.0$ ($d_{1T}$: an amount of movement of the first focusing lens unit in focusing at a telephoto limit, $d_{2T}$: an amount of movement of the second focusing lens unit in focusing at a telephoto limit).

9 Claims, 14 Drawing Sheets

ZOOM LENS SYSTEM, LENS BARREL, INTERCHANGEABLE LENS APPARATUS AND CAMERA SYSTEM

BACKGROUND OF THE INVENTION

1. Field of the Invention

The techniques disclosed herein relate to zoom lens systems, lens barrels, interchangeable lens apparatuses, and camera systems. In particular, the techniques disclosed herein relate to: compact and lightweight zoom lens systems having less aberration fluctuation in association with focusing, and excellent optical performance over the entire focusing condition with sufficiently compensated aberrations particularly in a close-object in-focus condition; and lens barrels, interchangeable lens apparatuses, and camera systems, each employing the zoom lens system.

2. Description of the Background Art

In recent years, interchangeable-lens type digital camera systems (also referred to simply as "camera systems", hereinafter) have been spreading rapidly. Such interchangeable-lens type digital camera systems realize: capturing of high-sensitive and high-quality images; high-speed focusing and high-speed image processing after image taking; and easy replacement of an interchangeable lens apparatus in accordance with a desired scene. Meanwhile, an interchangeable lens apparatus having a zoom lens system that forms an optical image with variable magnification is popular because it allows free change of focal length without the necessity of lens replacement.

Compact zoom lens systems having excellent optical performance from a wide-angle limit to a telephoto limit have been desired as zoom lens systems to be used in interchangeable lens apparatuses. Various kinds of zoom lens systems having multiple-unit constructions, such as four-unit construction and five-unit construction, have been proposed. In such zoom lens systems, focusing is usually performed so that some lens units in a lens system are moved in a direction along the optical axis. However, when performing focusing from an infinity in-focus condition to a close-object in-focus condition by a single lens unit, since an amount of movement of this lens unit responsible for focusing is determined by the paraxial power configuration in the entire lens system, it is difficult to sufficiently compensate the amount of aberration fluctuation from a wide-angle limit to a telephoto limit.

In order to reduce aberration fluctuation in focusing, zoom lens systems are proposed, in which a plurality of lens units in each lens system are moved independently from each other in a direction along the optical axis.

Japanese Laid-Open Patent Publication No. 2009-163271 discloses a zoom lens having four-unit construction of positive, negative, positive, and positive, with its overall length being fixed. In this zoom lens, a second lens unit and a fourth lens unit independently move in focusing.

Japanese Laid-Open Patent Publication No. 2001-281522 discloses a zoom lens having four-unit construction of positive, negative, positive, and negative, with its overall length being fixed. In this zoom lens, a second lens unit, a third lens unit, and a fourth lens unit move together in focusing.

Japanese Laid-Open Patent Publication No. 02-256011 discloses a zoom lens system having four-unit construction of positive, negative, positive, and positive. In this zoom lens system, all lens units independently move in zooming, and a third lens unit and a fourth lens unit independently move in focusing.

In each of the zoom lenses disclosed in Japanese Laid-Open Patent Publications Nos. 2009-163271 and 2001-281522, and in the zoom lens system disclosed in Japanese Laid-Open Patent Publication No. 02-256011, although aberration fluctuation in focusing is reduced to some extent, compensation of various aberrations particularly in a close-object in-focus condition is insufficient. Therefore, none of these zoom lenses and zoom lens system has excellent optical performance over the entire object distance from an infinite object distance to a close object distance, and is sufficiently compact.

SUMMARY OF THE INVENTION

The techniques disclosed herein have objects to provide: a compact and lightweight zoom lens system having less aberration fluctuation in association with focusing, and excellent optical performance over the entire focusing condition with sufficiently compensated aberrations particularly in a close-object in-focus condition; and a lens barrel, an interchangeable lens apparatus, and a camera system, each employing the zoom lens system.

One of the above objects is achieved by the following zoom lens system. The zoom lens system comprises a plurality of lens units, and performs zooming from a wide-angle limit to a telephoto limit, and focusing from an infinity in-focus condition to a close-object in-focus condition. The plurality of lens units include:

a first lens unit having positive optical power;

a first focusing lens unit which is located on an image side relative to the first lens unit, has negative optical power, and moves along an optical axis in the zooming and the focusing; and a second focusing lens unit which is located on the image side relative to the first focusing lens unit, has positive optical power, and moves along the optical axis in the zooming and the focusing. The zoom lens system satisfies the following condition (1):

$$|d_{2T}/d_{1T}|<1.0 \qquad (1)$$

where $d_{1T}$ is an amount of movement of the first focusing lens unit in focusing at a telephoto limit, and $d_{2T}$ is an amount of movement of the second focusing lens unit in focusing at a telephoto limit.

One of the above objects is achieved by the following lens barrel. The lens barrel comprises:

a zoom lens system; and a holder section for holding the zoom lens system. The zoom lens system comprises a plurality of lens units, and performs zooming from a wide-angle limit to a telephoto limit, and focusing from an infinity in-focus condition to a close-object in-focus condition. The plurality of lens units include:

a first lens unit having positive optical power;

a first focusing lens unit which is located on an image side relative to the first lens unit, has negative optical power, and moves along an optical axis in the zooming and the focusing; and a second focusing lens unit which is located on the image side relative to the first focusing lens unit, has positive optical power, and moves along the optical axis in the zooming and the focusing. The zoom lens system satisfies the following condition (1):

$$|d_{2T}/d_{1T}|<1.0 \qquad (1)$$

where $d_{1T}$ is an amount of movement of the first focusing lens unit in focusing at a telephoto limit, and $d_{2T}$ is an amount of movement of the second focusing lens unit in focusing at a telephoto limit.

One of the above objects is achieved by the following interchangeable lens apparatus. The interchangeable lens apparatus comprises:

a lens barrel having a zoom lens system, and a holder section for holding the zoom lens system; and a mount which is detachably connected to a camera body. The zoom lens system comprises a plurality of lens units, and performs zooming from a wide-angle limit to a telephoto limit, and focusing from an infinity in-focus condition to a close-object in-focus condition. The plurality of lens units include:

a first lens unit having positive optical power;

a first focusing lens unit which is located on an image side relative to the first lens unit, has negative optical power, and moves along an optical axis in the zooming and the focusing; and a second focusing lens unit which is located on the image side relative to the first focusing lens unit, has positive optical power, and moves along the optical axis in the zooming and the focusing. The zoom lens system satisfies the following condition (1):

$$|d_{2T}/d_{1T}|<1.0 \qquad (1)$$

where $d_{1T}$ is an amount of movement of the first focusing lens unit in focusing at a telephoto limit, and $d_{2T}$ is an amount of movement of the second focusing lens unit in focusing at a telephoto limit.

One of the above objects is achieved by the following camera system. The camera system comprises:

a lens barrel having a zoom lens system, and a holder section for holding the zoom lens system; and an image sensor which receives an optical image formed by the zoom lens system, and converts the optical image into an electric image signal. The zoom lens system comprises a plurality of lens units, and performs zooming from a wide-angle limit to a telephoto limit, and focusing from an infinity in-focus condition to a close-object in-focus condition. The plurality of lens units include:

a first lens unit having positive optical power;

a first focusing lens unit which is located on an image side relative to the first lens unit, has negative optical power, and moves along an optical axis in the zooming and the focusing; and a second focusing lens unit which is located on the image side relative to the first focusing lens unit, has positive optical power, and moves along the optical axis in the zooming and the focusing. The zoom lens system satisfies the following condition (1):

$$|d_{2T}/d_{1T}|<1.0 \qquad (1)$$

where $d_{1T}$ is an amount of movement of the first focusing lens unit in focusing at a telephoto limit, and $d_{2T}$ is an amount of movement of the second focusing lens unit in focusing at a telephoto limit.

One of the above objects is achieved by the following camera system. The camera system comprises:

an interchangeable lens apparatus which includes a lens barrel having a zoom lens system and a holder section for holding the zoom lens system, and a mount which is detachably connected to a camera body; and an image sensor which receives an optical image formed by the zoom lens system, and converts the optical image into an electric image signal. The zoom lens system comprises a plurality of lens units, and performs zooming from a wide-angle limit to a telephoto limit, and focusing from an infinity in-focus condition to a close-object in-focus condition. The plurality of lens units include:

a first lens unit having positive optical power;

a first focusing lens unit which is located on an image side relative to the first lens unit, has negative optical power, and moves along an optical axis in the zooming and the focusing; and a second focusing lens unit which is located on the image side relative to the first focusing lens unit, has positive optical power, and moves along the optical axis in the zooming and the focusing. The zoom lens system satisfies the following condition (1):

$$|d_{2T}/d_{1T}|<1.0 \qquad (1)$$

where $d_{1T}$ is an amount of movement of the first focusing lens unit in focusing at a telephoto limit, and $d_{2T}$ is an amount of movement of the second focusing lens unit in focusing at a telephoto limit.

According to the techniques disclosed herein, it is possible to provide: a compact and lightweight zoom lens system having less aberration fluctuation in association with focusing, and excellent optical performance over the entire focusing condition with sufficiently compensated aberrations particularly in a close-object in-focus condition; and a lens barrel, an interchangeable lens apparatus, and a camera system, each employing the zoom lens system.

These and other objects, features, aspects and advantages of the present invention will become more apparent from the following detailed description of the present invention when taken in conjunction with the accompanying drawings.

DESCRIPTION OF THE PREFERRED EMBODIMENTS (Embodiments 1 to 3)

FIGS. 1A-1C, 5A-5C, and 9A-9C are lens arrangement diagrams of zoom lens systems according to Embodiments 1 to 3, respectively. Each FIG. shows a zoom lens system in an infinity in-focus condition.

Figure 1A:
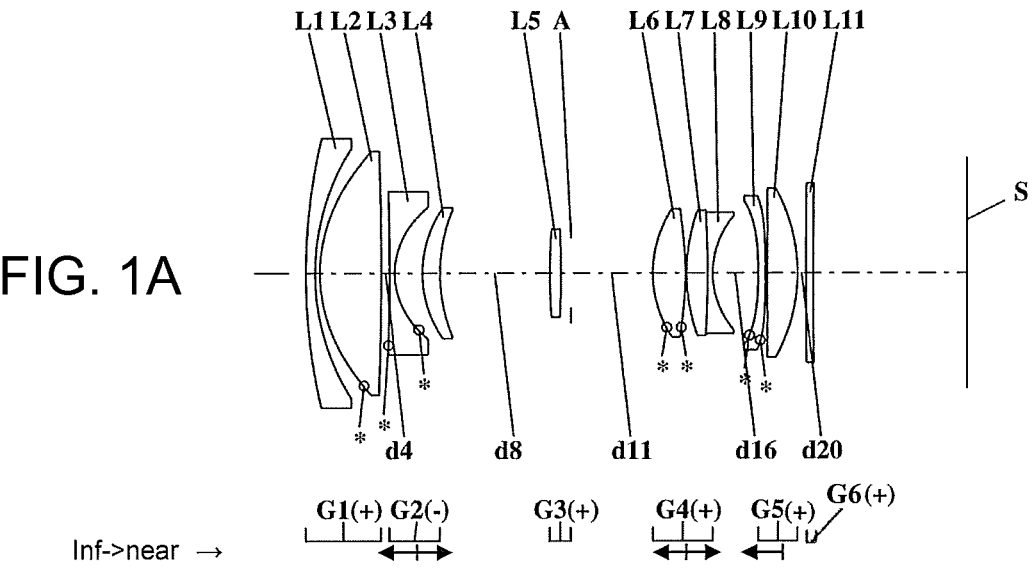
FIG. 1A shows a lens configuration at a wide-angle limit (in the minimum focal length condition: focal length $f_W$)
Figure 1B:
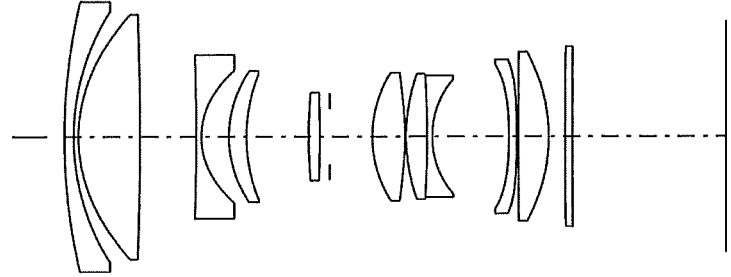
FIG. 1B shows a lens configuration at a middle position (in an intermediate focal length condition: focal length $f_M=\sqrt{(f_W*f_T)}$)
Figure 1C:
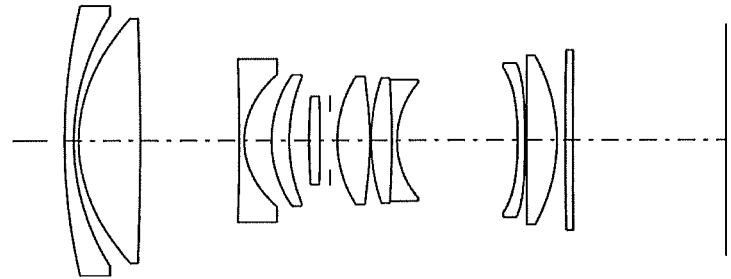
FIG. 1C shows a lens configuration at a telephone limit (in the maximum focal length condition: focal length $f_T$).
Figure 2A:
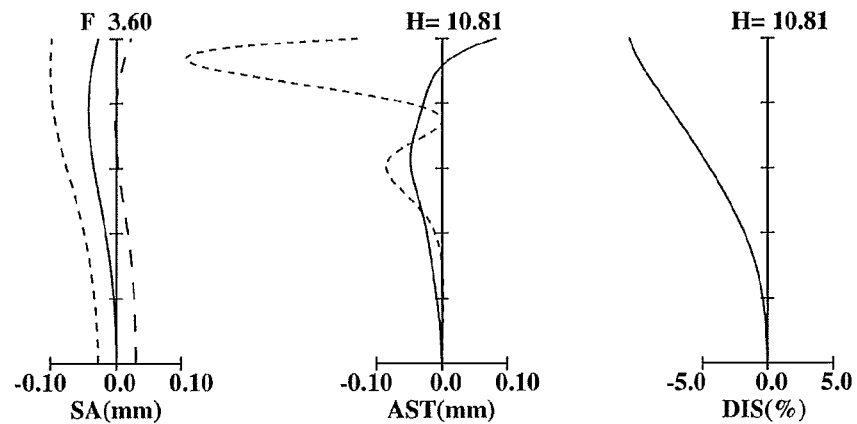
FIG. 2A shows the aberration at a wide-angle limit.
Figure 2B:
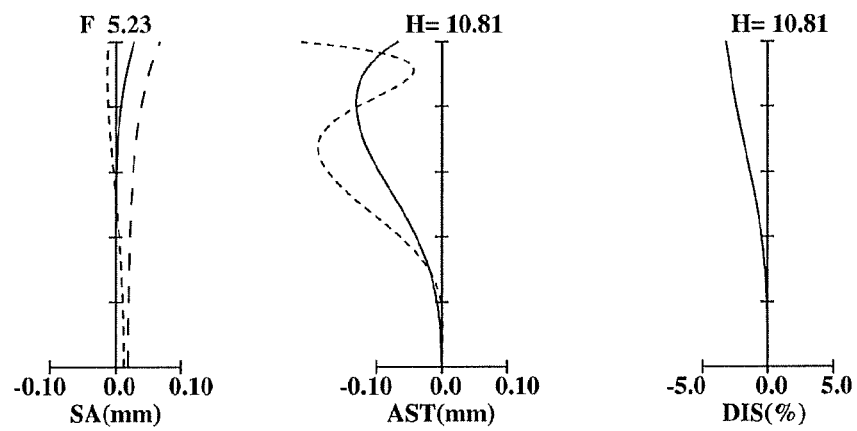
FIG. 2B shows the aberration at a middle position.
Figure 2C:
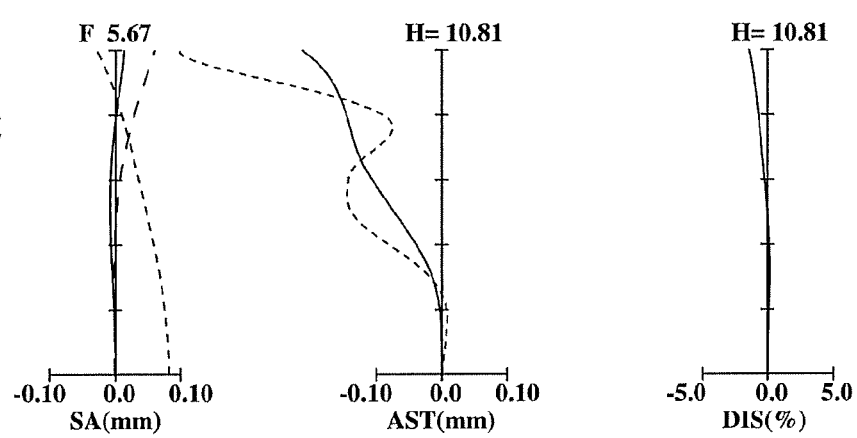
FIG. 2C shows the aberration at a telephone limit.
Figure 3A:
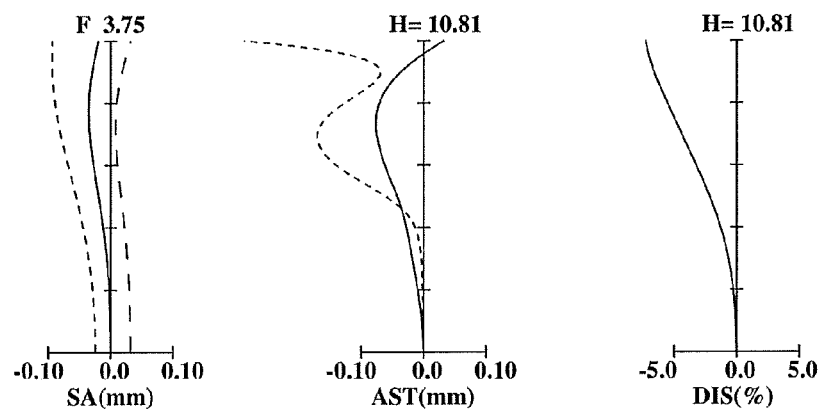
FIG. 3A shows the aberration at a wide-angle limit.
Figure 3B:
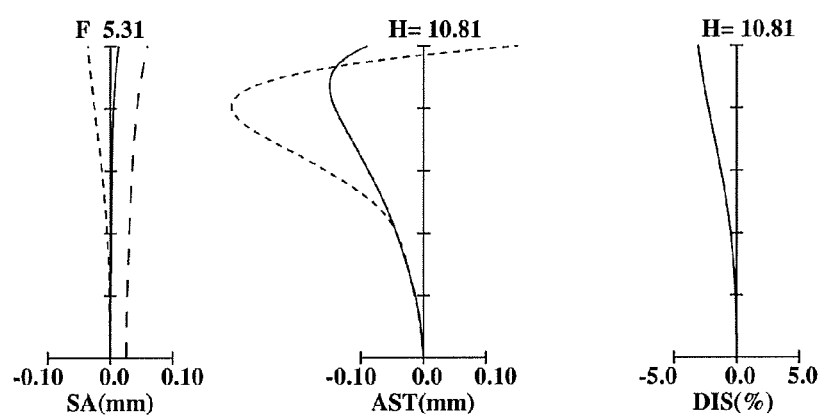
FIG. 3B shows the aberration at a middle position.
Figure 3C:
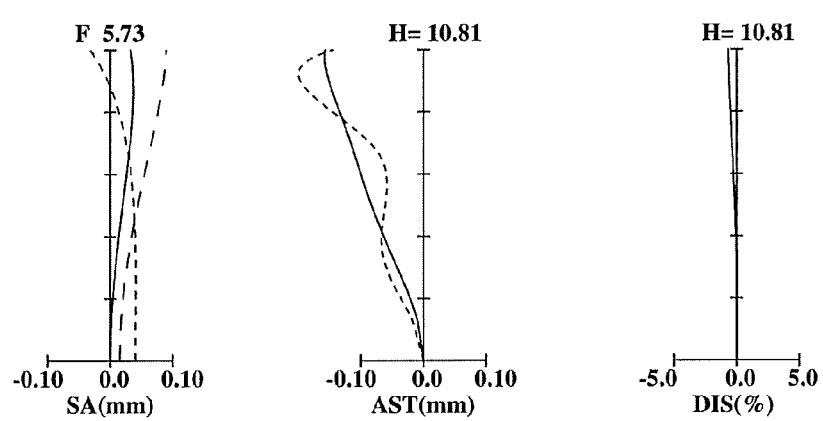
FIG. 3C shows the aberration at a telephone limit.
Figure 5A:
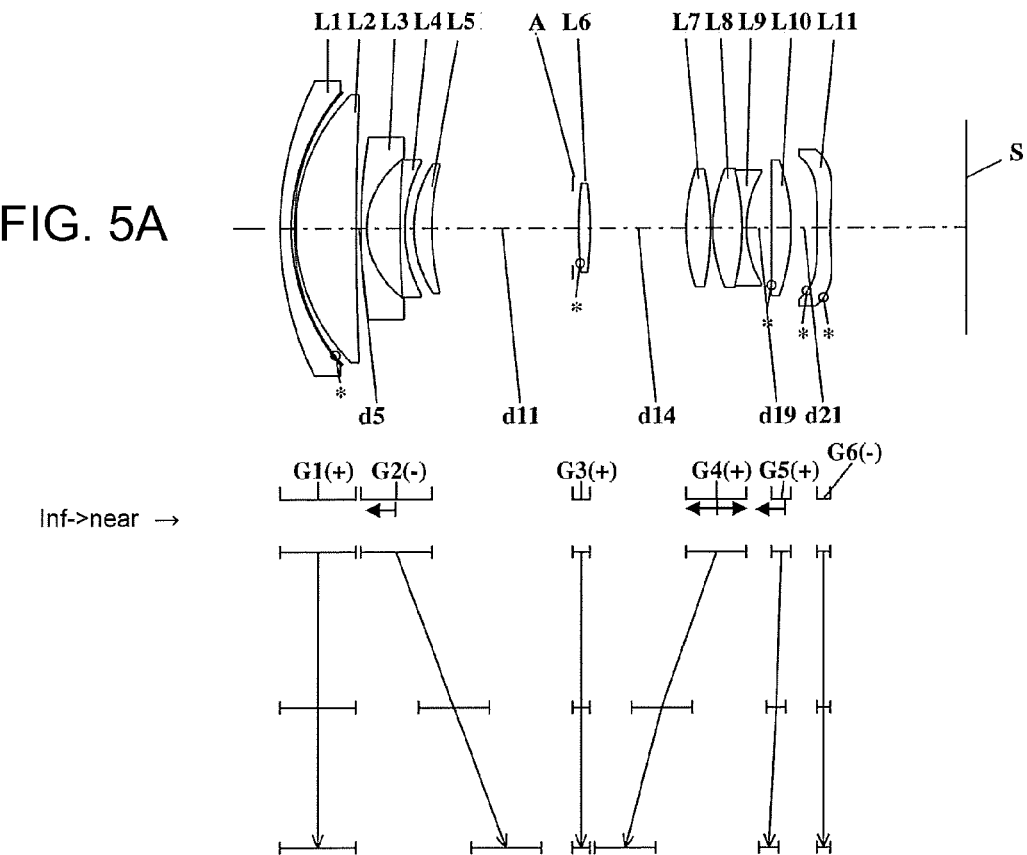
FIG. 5A shows a lens configuration at a wide-angle limit (in the minimum focal length condition: focal length $f_W$)
Figure 5B:
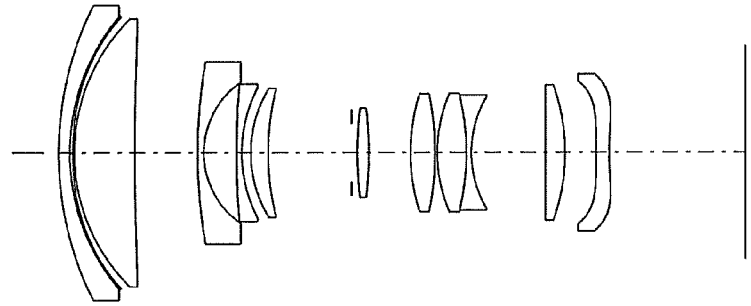
FIG. 5B shows a lens configuration at a middle position (in an intermediate focal length condition: focal length $f_M=\sqrt{(f_W*f_T)}$)
Figure 5C:
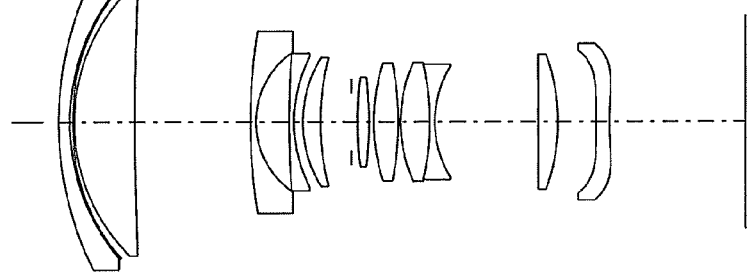
FIG. 5C shows a lens configuration at a telephone limit (in the maximum focal length condition: focal length $f_T$).
Figure 6A:
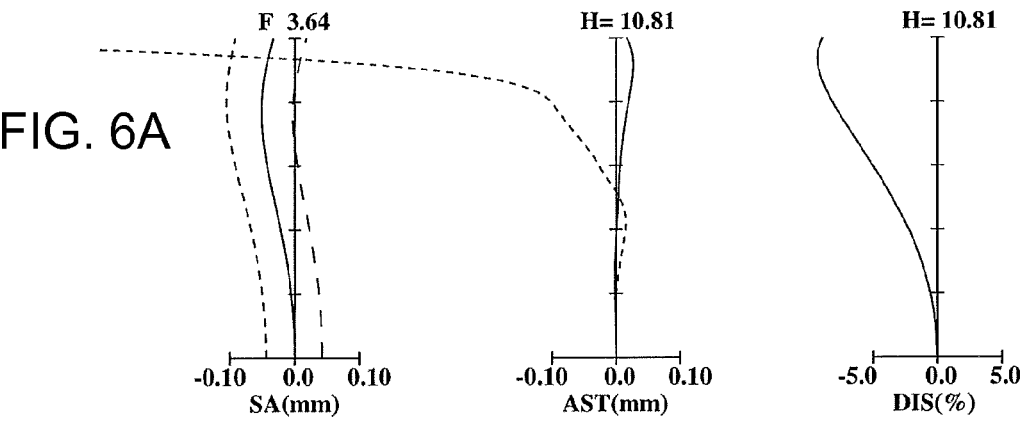
FIG. 6A shows the aberration at a wide-angle limit.
Figure 6B:
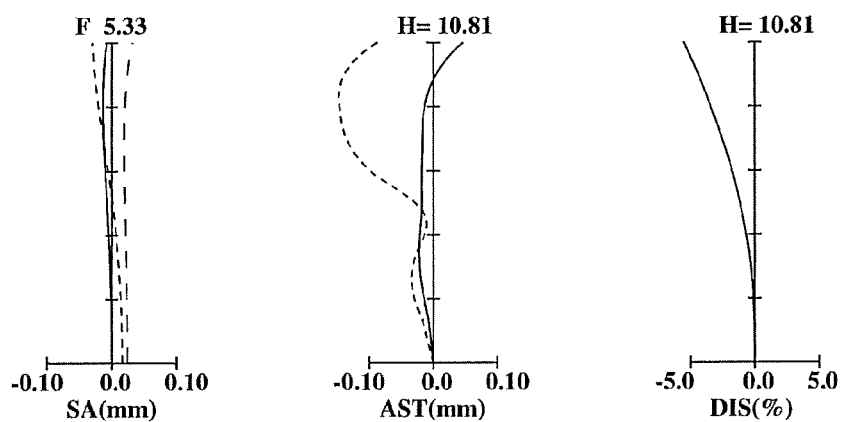
FIG. 6B shows the aberration at a middle position.
Figure 6C:
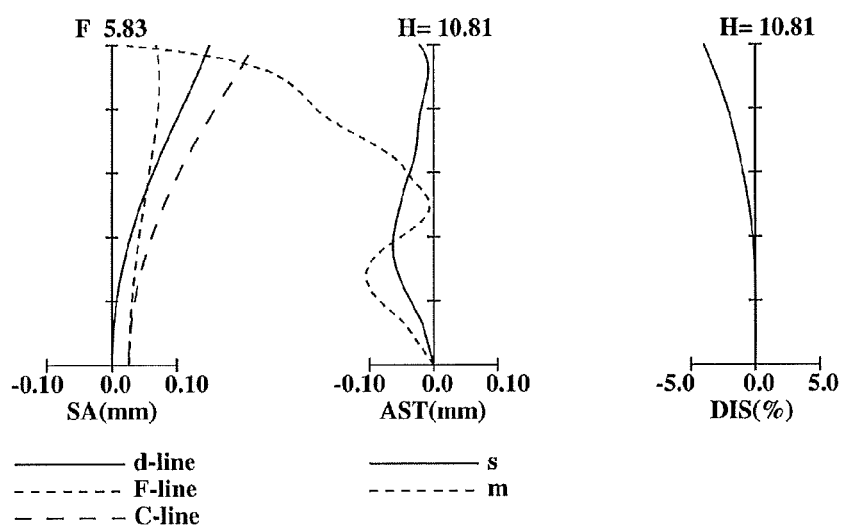
FIG. 6C shows the aberration at a telephone limit.
Figure 7A:
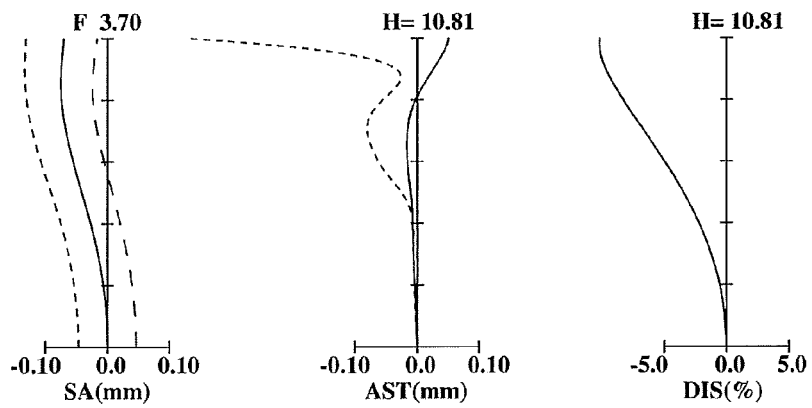
FIG. 7A shows the aberration at a wide-angle limit.
Figure 7B:
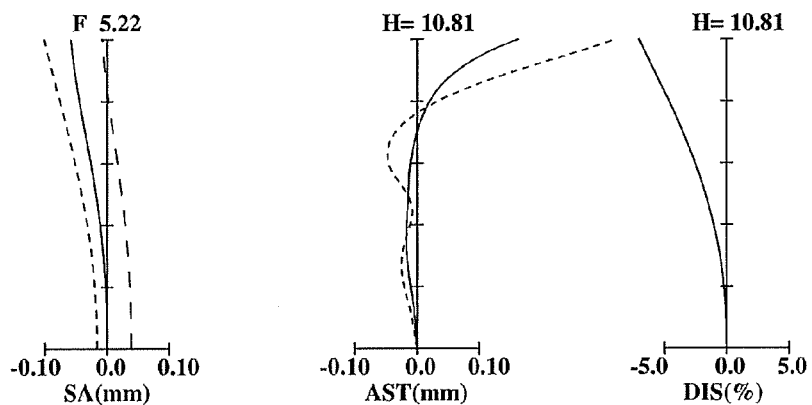
FIG. 7B shows the aberration at a middle position.
Figure 7C:
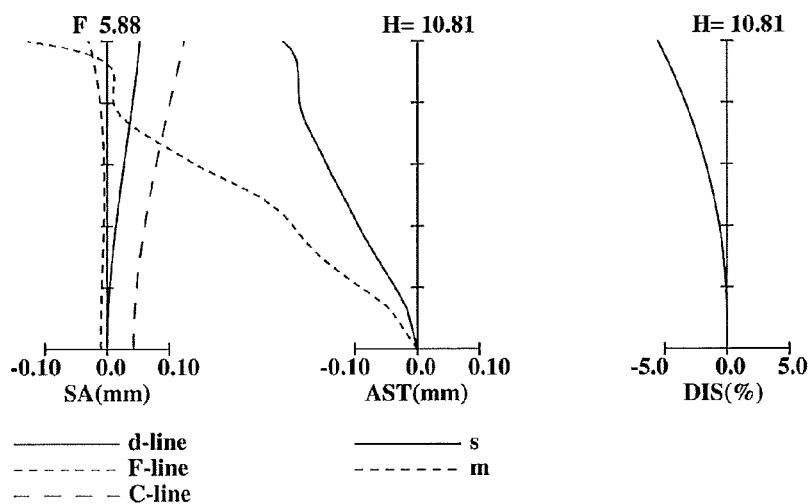
FIG. 7C shows the aberration at a telephone limit.
Figure 9A:
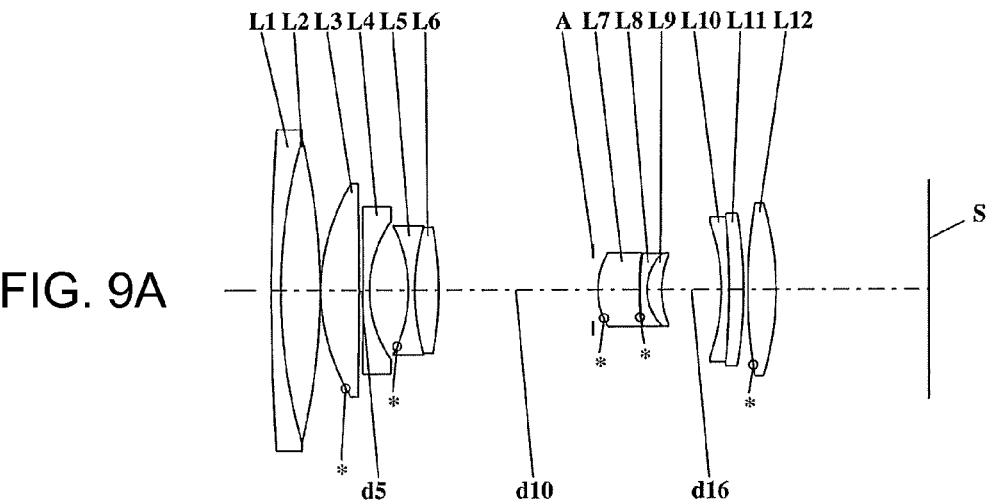
FIG. 9A shows a lens configuration at a wide-angle limit (in the minimum focal length condition: focal length $f_W$)
Figure 9B:
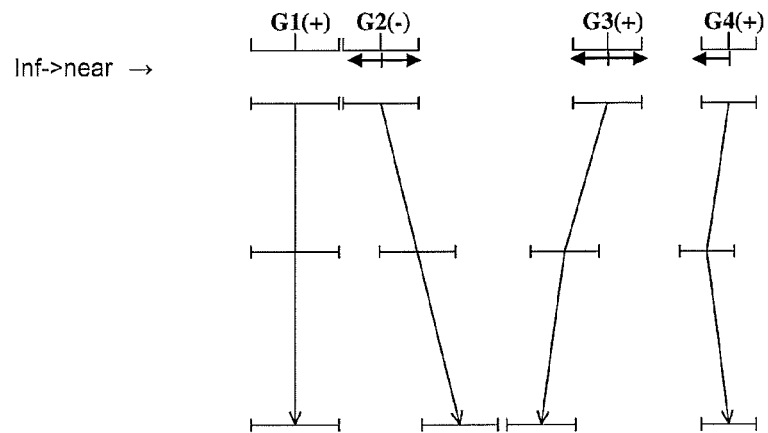
FIG. 9B shows a lens configuration at a middle position (in an intermediate focal length condition: focal length $f_M = \sqrt{(f_W \cdot f_T)}$)
Figure 9B:
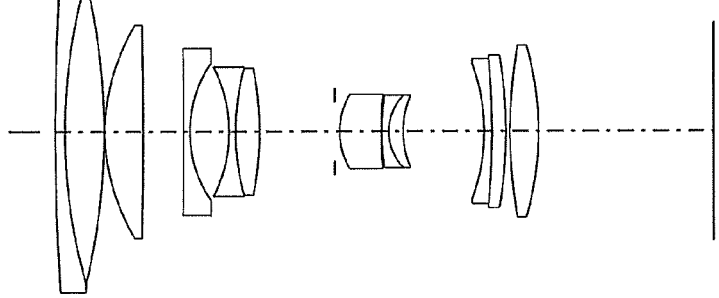
Figure 9C:
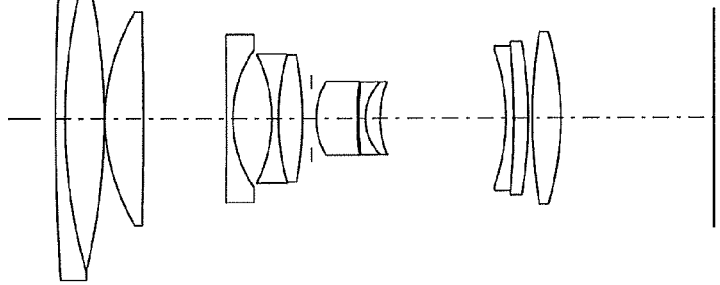
FIG. 9C shows a lens configuration at a telephone limit (in the maximum focal length condition: focal length $f_T$).
Figure 10A:
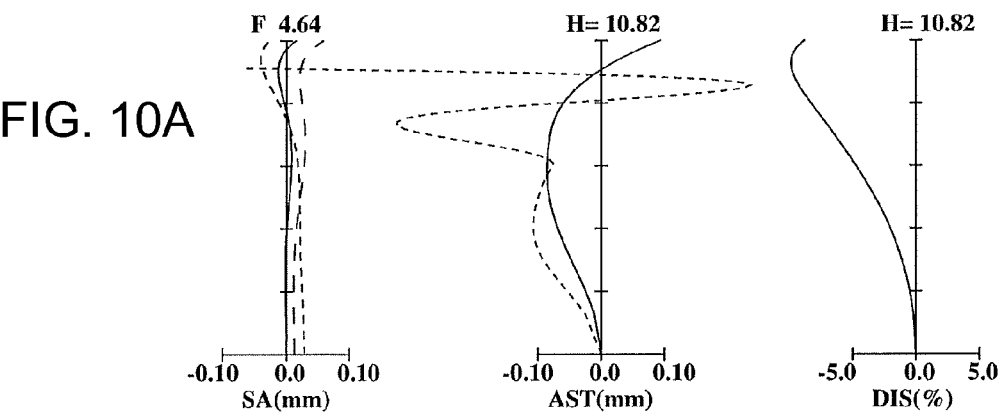
FIG. 10A shows the aberration at a wide-angle limit.
Figure 10B:
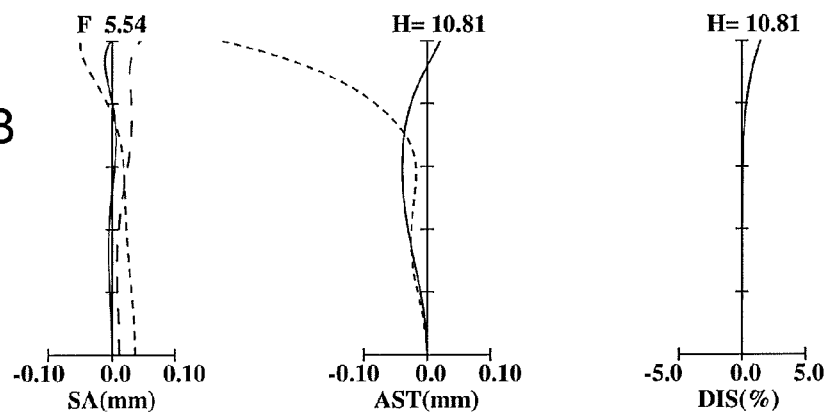
FIG. 10B shows the aberration at a middle position.
Figure 10C:
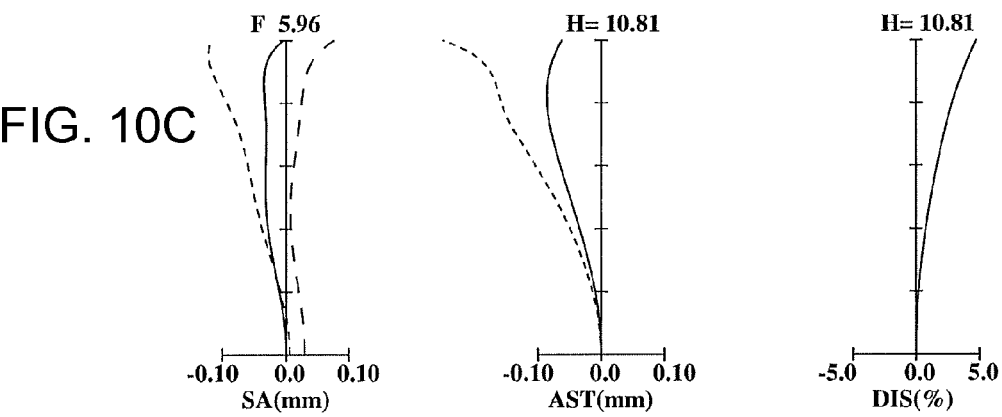
FIG. 10C shows the aberration at a telephone limit.
Figure 11A:
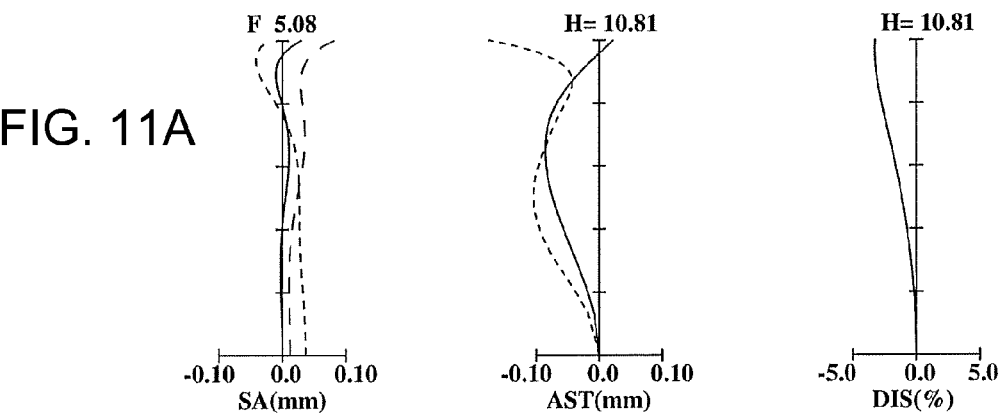
FIG. 11A shows the aberration at a wide-angle limit.
Figure 11B:
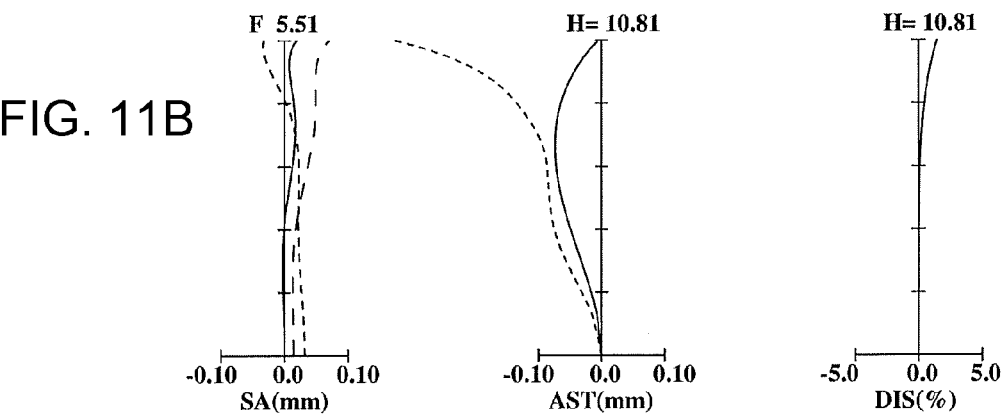
FIG. 11B shows the aberration at a middle position.
Figure 11C:
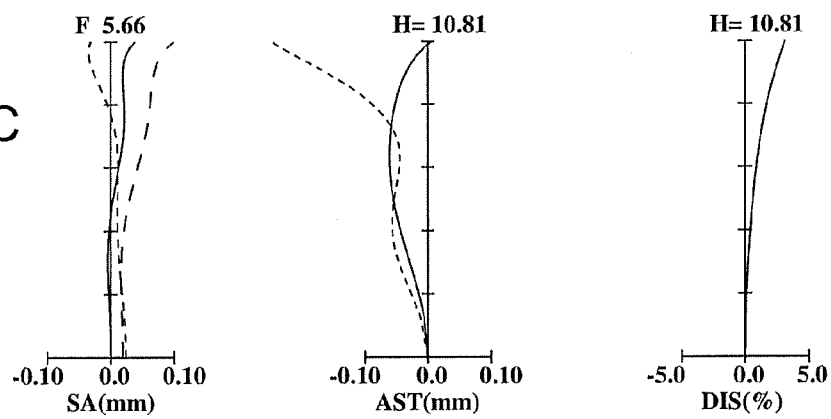
FIG. 11C shows the aberration at a telephone limit.

FIGS. 1A, 5A, and 9A shows a lens configuration at a wide-angle limit (in the minimum focal length condition: focal length $f_W$), FIGS. 1B, 5B, and 9B shows a lens configuration at a middle position (in an intermediate focal length condition: focal length $f_M = \sqrt{(f_W \cdot f_T)}$), and FIGS. 1C, 5C, and 9C shows a lens configuration at a telephoto limit (in the maximum focal length condition: focal length $f_T$). Further, in each FIG., each bent arrow located between FIGS. 1A, 5A, and 9A and FIGS. 1B, 5B, and 9B indicates a line obtained by connecting the positions of each lens unit respectively at a wide-angle limit, a middle position and a telephoto limit, in order from the top. In the part between the wide-angle limit and the middle position, and the part between the middle position and the telephoto limit, the positions are connected simply with a straight line, and hence this line does not indicate actual motion of each lens unit.

Moreover, in each FIG., an arrow imparted to a lens unit indicates focusing from an infinity in-focus condition to a close-object in-focus condition. That is, in FIGS. 1A-1C and 5A-C, the arrow indicates the moving direction of a second lens unit G2, a fourth lens unit G4, and a fifth lens unit G5, which are described later, in focusing from an infinity in-focus condition to a close-object in-focus condition. In FIGS. 9A-9C, the arrow indicates the moving direction of a second lens unit G2, a third lens unit G3, and a fourth lens unit G4, which are described later, in focusing from an infinity in-focus condition to a close-object in-focus condition. In FIGS. 1A-1C, 5A-5C, and 9A-9C, since the symbols of the respective lens units are imparted to FIGS. 1A, 5A, and 9A, the arrow indicating focusing is placed beneath each symbol of each lens unit for the convenience sake. However, the direction along which each lens unit moves in focusing in each zooming condition will be described later in detail for each embodiment.

The zoom lens system according to Embodiment 1, in order from the object side to the image side, comprises: a first lens unit G1 having positive optical power; a second lens unit G2 having negative optical power; a third lens unit G3 having positive optical power; a fourth lens unit G4 having positive optical power; a fifth lens unit G5 having positive optical power, and a sixth lens unit G6 having positive optical power. In the zoom lens system according to Embodiment 1, in zooming, the second lens unit G2, the fourth lens unit G4, and the fifth lens unit G5 individually move in the direction along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, and the interval between the fifth lens unit G5 and the sixth lens unit G6 vary. In the zoom lens system according to Embodiment 1, these lens units are arranged in a desired optical power configuration, thereby achieving size reduction of the entire lens system while maintaining high optical performance.

The zoom lens system according to Embodiment 2, in order from the object side to the image side, comprises: a first lens unit G1 having positive optical power; a second lens unit G2 having negative optical power; a third lens unit G3 having positive optical power; a fourth lens unit G4 having positive optical power; a fifth lens unit G5 having positive optical power, and a sixth lens unit G6 having negative optical power. In the zoom lens system according to Embodiment 2, in zooming, the second lens unit G2, the fourth lens unit G4, and the fifth lens unit G5 individually move in the direction along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, and the interval between the fifth lens unit G5 and the sixth lens unit G6 vary. In the zoom lens system according to Embodiment 2, these lens units are arranged in a desired optical power configuration, thereby achieving size reduction of the entire lens system while maintaining high optical performance.

The zoom lens system according to Embodiment 3, in order from the object side to the image side, comprises: a first lens unit G1 having positive optical power; a second lens unit G2 having negative optical power; a third lens unit G3 having positive optical power; and a fourth lens unit G4 having positive optical power. In the zoom lens system according to Embodiment 3, in zooming, the second lens unit G2, the third lens unit G3, and the fourth lens unit G4 individually move in the direction along the optical axis so that the intervals between the respective lens units, i.e., the interval between the first lens unit G1 and the second lens unit G2, the interval between the second lens unit G2 and the third lens unit G3, and the interval between the third lens unit G3 and the fourth lens unit G4 vary. In the zoom lens system according to Embodiment 3, these lens units are arranged in a desired optical power configuration, thereby achieving size reduction of the entire lens system while maintaining high optical performance.

In FIGS. 1A-1C, 5A-5C, and 9A-9C, an asterisk "*" imparted to a particular surface indicates that the surface is aspheric. In each FIG., symbol (+) or (−) imparted to the symbol of each lens unit corresponds to the sign of the optical power of the lens unit. In each FIG., a straight line located on the most right-hand side indicates the position of an image surface S.

As shown in FIGS. 1A-1C, an aperture diaphragm A is provided on the most image side in the third lens unit G3, i.e., on the image side relative to a fifth lens element L5. As shown in FIGS. 5A-5C, an aperture diaphragm A is provided on the most object side in the third lens unit G3, i.e., on the object side relative to a sixth lens element L6. Further, as shown in FIGS. 9A-9C, an aperture diaphragm A is provided on the most object side in the third lens unit G3, i.e., on the object side relative to a seventh lens element L7.

As shown in FIGS. 1A-1C in the zoom lens system according to Embodiment 1, the first lens unit G1, in order from the object side to the image side, comprises: a negative meniscus first lens element L1 with the convex surface facing the object side; and a bi-convex second lens element L2. The second lens element L2 has an aspheric object side surface.

In the zoom lens system according to Embodiment 1, the second lens unit G2, in order from the object side to the image side, comprises: a bi-concave third lens element L3; and a positive meniscus fourth lens element L4 with the convex surface facing the object side. The third lens element L3 has two aspheric surfaces.

In the zoom lens system according to Embodiment 1, the third lens unit G3 comprises solely a bi-convex fifth lens element L5. An aperture diaphragm A is provided on the image side relative to the fifth lens element L5.

In the zoom lens system according to Embodiment 1, the fourth lens unit G4, in order from the object side to the image side, comprises: a bi-convex sixth lens element L6; a bi-convex seventh lens element L7; and a bi-concave eighth lens element L8. Among these, the seventh lens element L7 and the eighth lens element L8 are cemented with each other. The sixth lens element L6 has two aspheric surfaces.

In the zoom lens system according to Embodiment 1, the fifth lens unit G5, in order from the object side to the image side, comprises: a negative meniscus ninth lens element L9 with the concave surface facing the object; and a bi-convex tenth lens element L10. The ninth lens element L9 has two aspheric surfaces.

In the zoom lens system according to Embodiment 1, the sixth lens unit G6 comprises solely a positive meniscus eleventh lens element L11 with the convex surface facing the object side.

In the zoom lens system according to Embodiment 1, the third lens unit G3 corresponds to an image blur compensating lens unit described later, which moves in a direction perpendicular to the optical axis in order to optically compensate image blur.

In the zoom lens system according to Embodiment 1, in zooming from a wide-angle limit to a telephoto limit at the time of image taking, the second lens unit G2 monotonically moves to the image side, the fourth lens unit G4 monotonically moves to the object side, the fifth lens unit G5 moves with locus of a convex to the object side, and the first lens unit G1, the third lens unit G3 and the sixth lens unit G6 are fixed relative to the image surface S. That is, the second lens unit G2, the fourth lens unit G4, and the fifth lens unit G5 individually move along the optical axis such that the interval between the first lens unit G1 and the second lens unit G2 and the interval between the fourth lens unit G4 and the fifth lens unit G5 increase, and the interval between the second lens unit G2 and the third lens unit G3 and the interval between the third lens unit G3 and the fourth lens unit G4 decrease in zooming from a wide-angle limit to a telephoto limit, and such that the interval between the fifth lens unit G5 and the sixth lens unit G6 increases in zooming from a wide-angle limit to a middle position, and the interval between the fifth lens unit G5 and the sixth lens unit G6 decreases in zooming from a middle position to a telephoto limit.

Further, in the zoom lens system according to Embodiment 1, in focusing from an infinity in-focus condition to a close-object in-focus condition, the second lens unit G2 moves to the image side along the optical axis at a wide-angle limit, and moves to the object side along the optical axis at a middle position and at a telephoto limit. In focusing from an infinity in-focus condition to a close-object in-focus condition, the fourth lens unit G4 moves to the object side along the optical axis at a wide-angle limit and at a middle position, and moves to the image side along the optical axis at a telephoto limit. In focusing from an infinity in-focus condition to a close-object in-focus condition, the fifth lens unit G5 moves to the object side along the optical axis at a wide-angle limit, at a middle position, and at a telephoto limit.

As shown in FIGS. 5A-5C, in the zoom lens system according to Embodiment 2, the first lens unit G1, in order from the object side to the image side, comprises: a negative meniscus first lens element L1 with the convex surface facing the object side; and a positive meniscus second lens element L2 with the convex surface facing the object side. A transparent resin layer is cemented to an image side surface of the first lens element L1, and an image side surface of the transparent resin layer is aspheric.

In the zoom lens system according to Embodiment 2, the second lens unit G2, in order from the object side to the image side, comprises: a negative meniscus third lens element L3 with the convex surface facing the object side; a negative meniscus fourth lens element L4 with the convex surface facing the object side; and a positive meniscus fifth lens element L5 with the convex surface facing the object side.

In the zoom lens system according to Embodiment 2, the third lens unit G3 comprises solely a bi-convex sixth lens element L6. The sixth lens element L6 has an aspheric object side surface. Further, an aperture diaphragm A is provided on the object side relative to the sixth lens element L6.

In the zoom lens system according to Embodiment 2, the fourth lens unit G4, in order from the object side to the image side, comprises: a bi-convex seventh lens element L7; a bi-convex eighth lens element L8; and a bi-concave ninth lens element L9. Among these, the eighth lens element L8 and the ninth lens element L9 are cemented with each other.

In the zoom lens system according to Embodiment 2, the fifth lens unit G5 comprises solely a bi-convex tenth lens element L10. The tenth lens element L10 has an aspheric object side surface.

In the zoom lens system according to Embodiment 2, the sixth lens unit G6 comprises solely a negative meniscus eleventh lens element L11. The eleventh lens element L11 has two aspheric surfaces.

In the zoom lens system according to Embodiment 2, the third lens unit G3 corresponds to an image blur compensating lens unit described later, which moves in a direction perpendicular to the optical axis in order to optically compensate image blur.

In the zoom lens system according to Embodiment 2, in zooming from a wide-angle limit to a telephoto limit at the time of image taking, the second lens unit G2 monotonically moves to the image side, the fourth lens unit G4 and the fifth lens unit G5 monotonically move to the object side, and the first lens unit G1, the third lens unit G3 and the sixth lens unit G6 are fixed relative to the image surface S. That is, the second lens unit G2, the fourth lens unit G4, and the fifth lens unit G5 individually move along the optical axis such that, in zooming from a wide-angle limit to a telephoto limit, the interval between the first lens unit G1 and the second lens unit G2, the interval between the fourth lens unit G4 and the fifth lens unit G5 and the interval between the fifth lens unit G5 and the sixth lens unit G6 increase, and the interval between the second lens unit G2 and the third lens unit G3 and the interval between the third lens unit G3 and the fourth lens unit G4 decrease.

Further, in the zoom lens system according to Embodiment 2, in focusing from an infinity in-focus condition to a close-object in-focus condition, the second lens unit G2 does not move along the optical axis at a wide-angle limit, and moves to the object side along the optical axis at a middle position and at a telephoto limit. In focusing from an infinity in-focus condition to a close-object in-focus condition, the fourth lens unit G4 moves to the object side along the optical axis at a wide-angle limit, moves to the image side along the optical axis at a middle position, and does not move along the optical axis at a telephoto limit. In focusing from an infinity in-focus condition to a close-object in-focus condition, the fifth lens unit G5 moves to the object side along the optical axis at a wide-angle limit, at a middle position, and at a telephoto limit.

As shown in FIGS. 9A-9C, in the zoom lens system according to Embodiment 3, the first lens unit G1, in order from the object side to the image side, comprises: a negative meniscus first lens element L1 with the convex surface facing the object side; a bi-convex second lens element L2; and a bi-convex third lens element L3. Among these, the first lens element L1 and the second lens element L2 are cemented with each other. Further, the third lens element L3 has an aspheric object side surface.

In the zoom lens system according to Embodiment 3, the second lens unit G2, in order from the object side to the image side, comprises: a bi-concave fourth lens element L4; a bi-concave fifth lens element L5; and a bi-convex sixth lens element L6. Among these, the fifth lens element L5 and the sixth lens element L6 are cemented with each other. Further, the fifth lens element L5 has an aspheric object side surface.

In the zoom lens system according to Embodiment 3, the third lens unit G3, in order from the object side to the image side, comprises: a positive meniscus seventh lens element L7 with the convex surface facing the object side; a negative meniscus eighth lens element L8 with the convex surface facing the object side; and a positive meniscus ninth lens element L9 with the convex surface facing the object side. Among these, the eighth lens element L8 and the ninth lens element L9 are cemented with each other. The seventh lens element L7 has two aspheric surfaces. Further, an aperture diaphragm A is provided on the object side relative to the seventh lens element L7.

In the zoom lens system according to Embodiment 3, the fourth lens unit G4, in order from the object side to the image side, comprises: a negative meniscus tenth lens element L10 with the concave surface facing the object side; a positive meniscus eleventh lens element L11 with the concave surface facing the object side; and a bi-convex twelfth lens element L12. Among these, the tenth lens element L10 and the eleventh lens element L11 are cemented with each other. The twelfth lens element L12 has an aspheric object side surface.

In the zoom lens system according to Embodiment 3, the third lens unit G3 corresponds to an image blur compensating lens unit described later, which moves in a direction perpendicular to the optical axis in order to optically compensate image blur.

In the zoom lens system according to Embodiment 3, in zooming from a wide-angle limit to a telephoto limit at the time of image taking, the second lens unit G2 monotonically moves to the image side, the third lens unit G3 monotonically moves to the object side, the fourth lens unit G4 moves with locus of a convex to the object side, and the first lens unit G1 is fixed relative to the image surface S. That is, the second lens unit G2, the third lens unit G3, and the fourth lens unit G4 individually move along the optical axis such that, in zooming from a wide-angle limit to a telephoto limit, the interval between the first lens unit G1 and the second lens unit G2 and the interval between the third lens unit G3 and the fourth lens unit G4 increase, and the interval between the second lens unit G2 and the third lens unit G3 decreases.

Further, in the zoom lens system according to Embodiment 3, in focusing from an infinity in-focus condition to a close-object in-focus condition, the second lens unit G2 moves to the image side along the optical axis at a wide-angle limit and at a middle position, and moves to the object side along the optical axis at a telephoto limit. In focusing from an infinity in-focus condition to a close-object in-focus condition, the third lens unit G3 moves to the object side along the optical axis at a wide-angle limit, and moves to the image side along the optical axis at a middle position and at a telephoto limit. In focusing from an infinity in-focus condition to a close-object in-focus condition, the fourth lens unit G4 moves to the object side along the optical axis at a wide-angle limit, at a middle position, and at a telephoto limit.

The zoom lens systems according to Embodiments 1 to 3 are each provided with an image blur compensating lens unit which moves in a direction perpendicular to the optical axis, in order to shift the position of the image in the direction perpendicular to the optical axis. The image blur compensating lens unit compensates image point movement caused by vibration of the entire system, that is, optically compensates image blur caused by hand blurring, vibration and the like.

When compensating image point movement caused by vibration of the entire system, the image blur compensating lens unit moves in the direction perpendicular to the optical axis, so that image blur is compensated in a state that size increase in the entire zoom lens system is suppressed to realize a compact construction and that excellent imaging characteristics such as small decentering coma aberration and small decentering astigmatism are satisfied.

The image blur compensating lens unit may be a single lens unit. If a single lens unit is composed of a plurality of lens elements, the image blur compensating lens unit may be any one lens element or a plurality of adjacent lens elements among the plurality of lens elements.

Each of the zoom lens systems according to Embodiments 1 to 3 includes a plurality of lens units, and performs zooming from a wide-angle limit to a telephoto limit, and focusing from an infinity in-focus condition to a close-object in-focus condition. The plurality of lens units include: a first lens unit having positive optical power; a first focusing lens unit which is located on the image side relative to the first lens unit, has negative optical power, and moves along the optical axis in zooming and focusing; and a second focusing lens unit which is located on the image side relative to the first focusing lens unit, has positive optical power, and moves along the optical axis in zooming and focusing. For example, in Embodiments 1 and 2, the first lens unit G1 has positive optical power, the second lens unit G2 corresponds to the first focusing lens unit, and the fourth lens unit G4 corresponds to the second focusing lens unit. In Embodiment 3, the first lens unit G1 has positive optical power, the second lens unit G2 corresponds to the first focusing lens unit, and the third lens unit G3 corresponds to the second focusing lens unit. The above-mentioned configuration realizes a compact and lightweight zoom lens system having less aberration fluctuation in association with focusing, and excellent optical performance over the entire focusing condition with sufficiently compensated aberrations particularly in a close-object in-focus condition.

In the zoom lens systems according to Embodiments 1 and 2, among the plurality of lens units, the first lens unit G1 is located closest to the object side. Among the plurality of lens units, the second lens unit G2 corresponding to the first focusing lens unit is the second closest to the object side, and the fourth lens unit G4 corresponding to the second focusing lens unit is the fourth closest to the object side. The above-mentioned configuration realizes a compact and lightweight zoom lens system having less aberration fluctuation in association with focusing, and excellent optical performance over the entire focusing condition with sufficiently compensated aberrations particularly in a close-object in-focus condition.

In the zoom lens systems according to Embodiments 1 to 3, the first lens unit G1 has a constant distance from the image surface S in both zooming and focusing. That is, the first lens unit G1 is fixed relative to the image surface S. Therefore, weight reduction of the movable lens units, which move in zooming, is achieved, and thereby actuators can be arranged inexpensively. In addition, generation of noise in zooming is suppressed. In addition, since the overall length of lens system is not varied, a user is allowed to easily operate the lens system. Further, entry of dust or the like into the lens system is sufficiently prevented.

In the zoom lens systems according to Embodiments 1 and 2, a lens unit located closest to the image side among the plurality of lens units, i.e., the sixth lens unit G6, is fixed relative to image surface S in both zooming and focusing. Therefore, when the zoom lens system is applied to an interchangeable lens apparatus, particularly when the zoom lens system is applied to an interchangeable lens apparatus having motorized zoom function, i.e., activating function for the zoom lens system by a motor, entry of dust or the like into the lens system is sufficiently prevented.

In the zoom lens systems according to Embodiments 1 to 3, the third lens unit G3 which is the third closest to the object side among the plurality of lens units moves in a direction perpendicular to the optical axis to cause the position of the image to shift in the direction perpendicular to the optical axis. Thereby, compensation of image blur is achieved in a state that size increase in the entire zoom lens system is suppressed to realize a compact construction and that excellent imaging characteristics such as small decentering coma aberration and small decentering astigmatism are satisfied.

The zoom lens system according to Embodiment 3 has a four-unit construction including the first to fourth lens units G1 to G4, and the zoom lens systems according to Embodiments 1 and 2 each have a six-unit construction including the first to sixth lens units G1 to G6. However, the number of lens units constituting the zoom lens system is not particularly limited so long as the zoom lens system includes a plurality of lens units arranged along the optical axis from the object side to the image side, and performs zooming from a wide-angle limit to a telephoto limit and focusing from an infinity in-focus condition to a close-object in-focus condition.

The following description is given for conditions preferred to be satisfied by a zoom lens system like the zoom lens systems according to Embodiments 1 to 3. Here, a plurality of preferable conditions are set forth for the zoom lens system according to each embodiment. A construction that satisfies all the plurality of conditions is most desirable for the zoom lens system. However, when an individual condition is satisfied, a zoom lens system having the corresponding effect is obtained.

For example, in a zoom lens system like the zoom lens systems according to Embodiments 1 to 3, which includes a plurality of lens units, and performs zooming from a wide-angle limit to a telephoto limit and focusing from an infinity in-focus condition to a close-object in-focus condition, in which the plurality of lens units include: a first lens unit having positive optical power; a first focusing lens unit which is located on the image side relative to the first lens unit, has negative optical power, and moves along the optical axis in zooming and focusing; and a second focusing lens unit which is located on the image side relative to the first focusing lens unit, has positive optical power, and moves along the optical axis in zooming and focusing (this lens configuration is referred to as a basic configuration of the embodiments, hereinafter), the following condition (1) is satisfied.

$$|d_{2T}/d_{1T}|<1.0 \qquad (1)$$

where $d_{1T}$ is an amount of movement of the first focusing lens unit in focusing at a telephoto limit, and $d_{2T}$ is an amount of movement of the second focusing lens unit in focusing at a telephoto limit.

When the first focusing lens unit moves to the object side along the optical axis, $d_{1T}$ is represented as a negative value. When the first focusing lens unit moves to the image side along the optical axis, $d_{1T}$ is represented as a positive value. When the second focusing lens unit moves to the object side along the optical axis, $d_{2T}$ is represented as a negative value. When the second focusing lens unit moves to the image side along the optical axis, $d_{2T}$ is represented as a positive value.

The condition (1) sets forth the relationship between an amount of movement of the first focusing lens unit in focusing at a telephoto limit, and an amount of movement of the second focusing lens unit in the focusing at a telephoto limit. When the value exceeds the upper limit of the condition (1), a space required for focusing increases, which causes an increase in the size of the zoom lens system.

When the following condition (1)' is satisfied, the above-mentioned effect is achieved more successfully.

$$|d_{2T}/d_{1T}|<0.5 \qquad (1)'$$

When the following condition (1)" is further satisfied, the above-mentioned effect is achieved more successfully.

$$|d_{2T}/d_{1T}|<0.10 \qquad (1)''$$

For example, a zoom lens system having the basic configuration like the zoom lens systems according to Embodiments 1 to 3 preferably satisfies the following condition (2).

$$|d_{1W}/d_{2W}|<1.0 \qquad (2)$$

where $d_{1W}$ is an amount of movement of the first focusing lens unit in focusing at a wide-angle limit, and $d_{2W}$ is an amount of movement of the second focusing lens unit in focusing at a wide-angle limit When the first focusing lens unit moves to the object side along the optical axis, $d_{1W}$ is represented as a negative value. When the first focusing lens unit moves to the image side along the optical axis, $d_{1W}$ is represented as a positive value. When the second focusing lens unit moves to the object side along the optical axis, $d_{2W}$ is represented as a negative value. When the second focusing lens unit moves to the image side along the optical axis, $d_{2W}$ is represented as a positive value.

The condition (2) sets forth the relationship between an amount of movement of the first focusing lens unit in focusing at a wide-angle limit, and an amount of movement of the second focusing lens unit in the focusing at a wide-angle limit. When the value exceeds the upper limit of the condition (2), a space required for focusing increases, which causes an increase in the size of the zoom lens system.

When the following condition (2)' is satisfied, the above-mentioned effect is achieved more successfully.

$$|d_{1W}/d_{2W}|<0.75 \qquad (2)'$$

When the following condition (2)'' is further satisfied, the above-mentioned effect is achieved more successfully.

$$|d_{1W}/d_{2W}|<0.50 \qquad (2)''$$

For example, a zoom lens system having the basic configuration like the zoom lens systems according to Embodiments 1 to 3 preferably satisfies the following conditions (3) and (4).

$$-1.5<f_{1f}/f_W<-0.35 \qquad (3)$$

$$0.5<f_{2f}/f_W<5.0 \qquad (4)$$

where
$f_{1f}$ is a focal length of the first focusing lens unit,
$f_{2f}$ is a focal length of the second focusing lens unit, and
$f_W$ is a focal length of the entire zoom lens system at a wide-angle limit The conditions (3) and (4) set forth the relationship among a focal length of the first focusing lens unit, a focal length of the second focusing lens unit, and a focal length of the entire zoom lens system at a wide-angle limit. When the value exceeds the upper limit of the condition (3), it is difficult to compensate various aberrations in a close-object in-focus condition, which might cause a reduction in optical performance. When the value goes below the lower limit of the condition (3), a space required for focusing increases, which might cause an increase in the size of the zoom lens system. When the value exceeds the upper limit of the condition (4), a space required for focusing increases, which might cause an increase in the size of the zoom lens system. When the value goes below the lower limit of the condition (4), it is difficult to compensate various aberrations in a close-object in-focus condition, which might cause a reduction in optical performance.

When at least one of the following conditions (3)'-1, (3)'-2, (4)'-1, and (4)'-2 is satisfied, the above-mentioned effect is achieved more successfully.

$$-1.2<f_{1f}/f_W \qquad (3)'\text{-}1$$

$$f_{1F}/f_W<-0.50 \qquad (3)'\text{-}2$$

$$0.75<f_{2f}/f_W \qquad (4)'\text{-}1$$

$$f_{2f}/f_W<4.20 \qquad (4)'\text{-}2$$

When at least one of the following conditions (3)''-1, (4)''-1, and (4)''-2 is further satisfied, the above-mentioned effect is achieved more successfully.

$$-0.9<f_{1f}/f_W \qquad (3)''\text{-}1$$

$$f_{1f}/f_W<-0.60 \qquad (3)''\text{-}2$$

$$1.7<f_{2f}/f_W \qquad (4)''\text{-}1$$

$$f_{2f}/f_W<3.5 \qquad (4)''\text{-}2$$

The individual lens units constituting the zoom lens systems according to Embodiments 1 to 3 are each composed exclusively of refractive type lens elements that deflect incident light by refraction (that is, lens elements of a type in which deflection is achieved at the interface between media having different refractive indices). However, the present invention is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is preferable.

(Embodiment 4)

Figure 13:
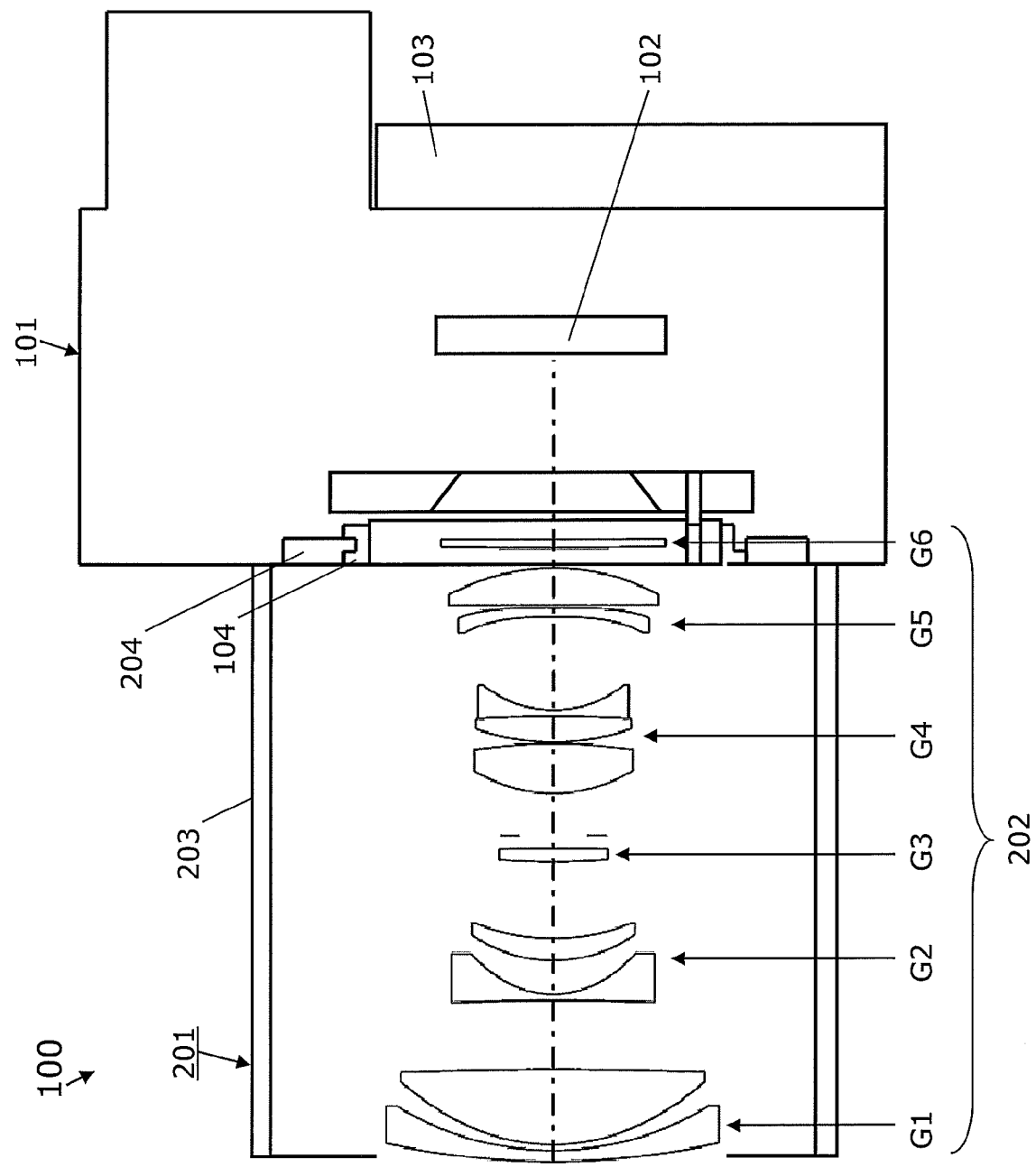
FIG. 13 is a schematic construction diagram of a camera system according to Embodiment 4.

FIG. 13 is a schematic construction diagram of a camera system according to Embodiment 4.

The camera system 100 according to Embodiment 4 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a display section 103 which displays the image signal obtained by the image sensor 102; and a camera mount section 104. On the other hand, the interchangeable lens apparatus 201 includes: a zoom lens system 202 according to any of Embodiments 1 to 3; a lens barrel 203 having a holder section for holding the zoom lens system 202; and a lens mount section 204 (an example of a mount) connected to the camera mount section 104 of the camera body. The camera mount section 104 and the lens mount section 204 are physically connected to each other. Moreover, the camera mount section 104 and the lens mount section 204 function as interfaces which allow the camera body and the interchangeable lens apparatus to exchange signals, by electrically connecting a controller (not shown) in the camera body 101 and a controller (not shown) in the interchangeable lens apparatus 201. In FIG. 13, the zoom lens system according to Embodiment 1 is employed as the zoom lens system 202. However, a zoom lens system according to any of embodiments may be employed.

In Embodiment 4, since the zoom lens system 202 according to any of Embodiments 1 to 3 is employed, a compact interchangeable lens apparatus 201 having excellent imaging performance can be realized at low cost. Moreover, size reduction and cost reduction of the entire camera system 100 according to Embodiment 4 can be achieved.

(Embodiment 5)

Figure 14:
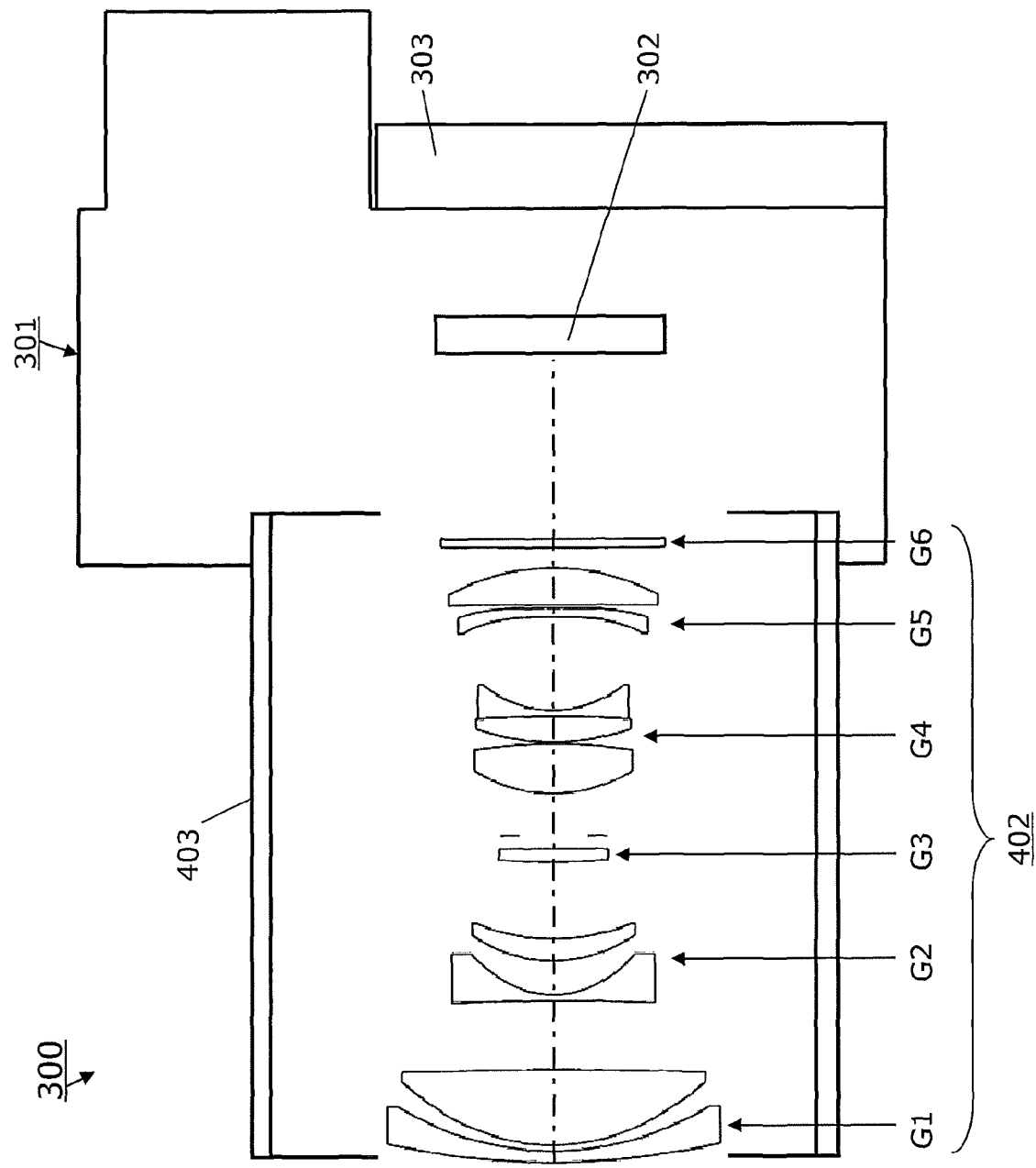
FIG. 14 is a schematic construction diagram of a camera system according to Embodiment 5.

FIG. 14 is a schematic construction diagram of a camera system according to Embodiment 5.

The camera system 300 according to Embodiment 5 includes a camera body 301, and a lens barrel 403 which is fixed to the camera body 301.

The camera body 301 includes: an image sensor 302 which receives an optical image formed by a zoom lens system 402, and converts the optical image into an electric image signal; and a display section 303 which displays the image signal obtained by the image sensor 302. On the other hand, the lens barrel 403 holds, in its holder section, a zoom lens system 402 according to any of Embodiments 1 to 3. In FIG. 14, the zoom lens system according to Embodiment 1 is employed as the zoom lens system 402. However, a zoom lens system according to any of embodiments may be employed.

In Embodiment 5, since the zoom lens system 402 according to any of Embodiments 1 to 3 is employed, a compact lens barrel 403 having excellent imaging performance can be realized at low cost. Moreover, size reduction and cost reduction of the entire camera system 300 according to Embodiment 5 can be achieved.

(Other Embodiments)

The present invention is not limited to the above embodiments, and various changes and modifications may be made so far as they do not deviate from the spirit of the invention. Other embodiments of the present invention will be collectively described below.

In the zoom lens systems according to Embodiments 1 to 3, the entire zooming range need not be used. That is, in accordance with a desired zooming range, a range where satisfactory optical performance is secured may exclusively be used. Then, the zoom lens system may be used as one having a lower magnification than the zoom lens systems described in Embodiments 1 to 3.

As the image sensor, for example, a CCD (Charge Coupled Device) image sensor or a CMOS (Complementary Metal Oxide Semiconductor) image sensor may be employed.

As the display section, any display capable of displaying an image, such as a liquid crystal display, an organic EL display, an inorganic EL display, or a plasma display panel, may be employed.

NUMERICAL EXAMPLES

Numerical examples are described below in which the zoom lens systems according to Embodiments 1 to 3 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and An is a n-th order aspherical coefficient.

Numerical Example 1

The zoom lens system of Numerical Example 1 corresponds to Embodiment 1 shown in FIGS. 1A-1C. Table 1 shows the surface data of the zoom lens system of Numerical Example 1. Table 2 shows the aspherical data. Table 3 shows various data in an infinity in-focus condition. Table 4 shows various data in a close-object in-focus condition.

TABLE 1

(Surface data)

| Surface number | r | d | nd | vd |
|---|---|---|---|---|
| Object surface | ∞ | | | |
| 1 | 58.55310 | 0.90000 | 1.84666 | 23.8 |
| 2 | 23.17850 | 0.45740 | | |
| 3* | 15.19890 | 6.00050 | 1.75234 | 51.5 |
| 4 | −322.25880 | Variable | | |
| 5* | −298.41730 | 0.50000 | 1.88300 | 40.8 |
| 6* | 7.18980 | 2.70520 | | |

TABLE 1-continued (Surface data)

| Surface number | r | d | nd | vd |
|---|---|---|---|---|
| 7 | 11.19070 | 1.74290 | 1.94595 | 18.0 |
| 8 | 16.11350 | Variable | | |
| 9 | 56.47090 | 1.07830 | 1.79883 | 25.1 |
| 10 | −146.68670 | 1.00000 | | |
| 11(Diaphragm) | ∞ | Variable | | |
| 12* | 11.38760 | 3.19430 | 1.63818 | 59.2 |
| 13* | −29.11570 | 0.10680 | | |
| 14 | 18.69170 | 2.02710 | 1.70394 | 55.7 |
| 15 | −101.43800 | 0.50000 | 1.83173 | 28.3 |
| 16 | 8.72020 | Variable | | |
| 17* | −40.29170 | 0.68580 | 1.82314 | 31.1 |
| 18* | −303.06340 | 0.20000 | | |
| 19 | 2331.75420 | 2.97790 | 1.63625 | 57.0 |
| 20 | −17.24140 | Variable | | |
| 21 | 600.00000 | 0.70000 | 1.84666 | 23.8 |
| 22 | 600.00000 | (BF) | | |
| Image surface | ∞ | | | |

TABLE 2

(Aspherical data)

Surface No. 3

$K = 0.00000E+00, A4 = -2.05300E-05, A6 = -1.05378E-07,$
$A8 = 1.38283E-10\ A10 = -1.86247E-12, A12 = -4.27288E-15$

Surface No. 5

$K = 0.00000E+00, A4 = -1.55763E-05, A6 = -2.60913E-07,$
$A8 = 1.97249E-08\ A10 = -3.50189E-10, A12 = 2.04222E-12$

Surface No. 6

$K = 0.00000E+00, A4 = -2.11629E-04, A6 = -4.41843E-07,$
$A8 = -2.11013E-07\ A10 = 6.43873E-09, A12 = -1.12806E-10$

Surface No. 12

$K = 0.00000E+00, A4 = -6.15501E-05, A6 = 1.52770E-06,$
$A8 = -7.65651E-08\ A10 = 1.04526E-09, A12 = 7.11156E-12$

Surface No. 13

$K = 0.00000E+00, A4 = 8.70527E-05, A6 = 2.69854E-06,$
$A8 = -1.38294E-07\ A10 = 2.33842E-09, A12 = 0.00000E+00$

Surface No. 17

$K = 0.00000E+00, A4 = -2.95589E-04, A6 = 3.06843E-06,$
$A8 = -1.12097E-07\ A10 = 2.73955E-09, A12 = -3.24392E-11$

Surface No. 18

$K = 0.00000E+00, A4 = -2.41960E-04, A6 = 6.57528E-07,$
$A8 = 2.26090E-08\ A10 = -4.49845E-10, A12 = 0.00000E+00$

TABLE 3

(Various data in an infinity in-focus condition)

Zooming ratio 2.79669

|  | Wide-angle limit | Middle position | Telephoto limit |
|---|---|---|---|
| Focal length | 14.5995 | 24.4203 | 40.8301 |
| F-number | 3.60125 | 5.22929 | 5.66532 |
| View angle | 39.6692 | 24.5854 | 15.0405 |
| Image height | 10.8150 | 10.8150 | 10.8150 |
| Overall length of lens system | 64.6931 | 64.6821 | 64.6641 |
| BF | 15.06331 | 15.05219 | 15.03427 |
| d4 | 0.8029 | 5.5026 | 9.6985 |
| d8 | 10.8177 | 6.1193 | 1.9271 |
| d11 | 8.0384 | 4.1859 | 0.7306 |
| d16 | 4.3780 | 7.4424 | 11.6594 |
| d20 | 0.8166 | 1.6035 | 0.8380 |
| Entrance pupil position | 16.3149 | 25.8404 | 36.4843 |
| Exit pupil position | −30.5671 | −28.4389 | −31.4005 |
| Front principal points position | 26.2432 | 36.5487 | 41.4125 |
| Back principal points position | 50.0937 | 40.2618 | 23.8340 |

Zoom lens unit data

| Lens unit | Initial surface No. | Focal length | Overall length of lens unit | Front principal points position | Back principal points position |
|---|---|---|---|---|---|
| 1 | 1 | 33.38616 | 7.35790 | 1.31375 | 4.27365 |
| 2 | 5 | −10.88292 | 4.94810 | −0.06188 | 1.11218 |
| 3 | 9 | 51.16276 | 2.07830 | 0.16702 | 0.64446 |
| 4 | 12 | 25.75718 | 5.82820 | −5.21524 | −1.28671 |
| 5 | 17 | 47.46087 | 3.86370 | 4.24847 | 5.90075 |
| 6 | 21 | 1324886.5 | 0.70000 | −708.65999 | −707.96000 |

TABLE 4

(Various data in a close-object in-focus condition)
Zooming ratio 2.05580

|  | Wide-angle limit | Middle position | Telephoto limit |
|---|---|---|---|
| Focal length | 15.9246 | 22.8353 | 32.7377 |
| F-number | 3.74591 | 5.30525 | 5.72822 |
| View angle | 35.6058 | 24.9249 | 16.4765 |
| Image height | 10.8150 | 10.8150 | 10.8150 |
| Overall length of lens system | 64.6917 | 64.6849 | 64.6725 |
| BF | 15.06361 | 15.05714 | 15.04489 |
| d4 | 1.7473 | 5.1298 | 8.4785 |
| d8 | 9.8717 | 6.4895 | 3.1407 |
| d11 | 6.9044 | 3.8486 | 0.8793 |
| d16 | 3.8972 | 4.7000 | 3.8972 |
| d20 | 2.4313 | 4.6837 | 8.4557 |
| Entrance pupil position | 18.0270 | 24.9882 | 33.2042 |
| Exit pupil position | −27.3985 | −24.4341 | −22.0384 |
| Front principal points position | 27.8453 | 33.9433 | 33.4371 |
| Back principal points position | 47.8346 | 39.9262 | 27.8237 |

Numerical Example 2

The zoom lens system of Numerical Example 2 corresponds to Embodiment 2 shown in FIGS. 5A-5C. Table 5 shows the surface data of the zoom lens system of Numerical Example 2. Table 6 shows the aspherical data. Table 7 shows various data in an infinity in-focus condition. Table 8 shows various data in a close-object in-focus condition.

TABLE 5

(Surface data)

| Surface number | r | d | nd | vd |
|---|---|---|---|---|
| Object surface | ∞ |  |  |  |
| 1 | 34.87270 | 1.20000 | 1.84666 | 23.8 |
| 2 | 22.75020 | 0.28370 | 1.51345 | 49.9 |
| 3* | 25.07450 | 0.20000 |  |  |
| 4 | 20.20000 | 6.41180 | 1.77250 | 49.6 |
| 5 | 323.13430 | Variable |  |  |
| 6 | 60.27280 | 0.60000 | 2.00100 | 29.1 |
| 7 | 9.06640 | 3.50080 |  |  |
| 8 | 97.52900 | 0.50000 | 1.69680 | 55.5 |
| 9 | 14.99940 | 0.95670 |  |  |
| 10 | 13.03990 | 1.85560 | 1.94595 | 18.0 |
| 11 | 27.54920 | Variable |  |  |
| 12(Diaphragm) | ∞ | 0.65000 |  |  |
| 13* | 41.97230 | 1.18120 | 1.60602 | 57.4 |
| 14 | −41.01740 | Variable |  |  |
| 15 | 20.78040 | 2.58790 | 1.58913 | 61.3 |
| 16 | −32.62610 | 0.23020 |  |  |
| 17 | 15.67810 | 3.09350 | 1.69680 | 55.5 |
| 18 | −26.86850 | 0.50000 | 1.90366 | 31.3 |
| 19 | 11.38690 | Variable |  |  |
| 20* | 557.75490 | 2.08440 | 1.58332 | 59.1 |
| 21 | −21.19950 | Variable |  |  |
| 22* | 145.41390 | 1.35380 | 1.54360 | 56.0 |
| 23* | 26.78310 | (BF) |  |  |
| Image surface | ∞ |  |  |  |

TABLE 6

(Aspherical data)

Surface No. 3

K = 0.00000E+00, A4 = 5.78173E−06, A6 = 8.32865E−08,
A8 = −8.92429E−10 A10 = 6.70059E−12,
A12 = −2.44068E−14, A14 = 3.74343E−17

Surface No. 13

K = 0.00000E+00, A4 = −2.43435E−05, A6 = −1.58424E−07,
A8 = −1.25340E−08 A10 = 3.20084E−10,
A12 = 0.00000E+00, A14 = 0.00000E+00

Surface No. 20

K = 0.00000E+00, A4 = −6.98266E−05, A6 = 1.33045E−06,
A8 = −6.62481E−09 A10 = −1.59403E−11,
A12 = 0.00000E+00, A14 = 0.00000E+00

Surface No. 22

K = 9.79472E+00, A4 = −4.90072E−04, A6 = −1.02230E−06,
A8 = −5.16888E−09 A10 = −3.92412E−10,
A12 = 0.00000E+00, A14 = 0.00000E+00

Surface No. 23

K = 0.00000E+00, A4 = −5.75455E−04, A6 = 6.81282E−07,
A8 = −3.38259E−09 A10 = −1.17658E−10,
A12 = 0.00000E+00, A14 = 0.00000E+00

TABLE 7

(Various data in an infinity in-focus condition)

Zooming ratio 2.98255

| | Wide-angle limit | Middle position | Telephoto limit |
|---|---|---|---|
| Focal length | 14.5633 | 25.2004 | 43.4357 |
| F-number | 3.64091 | 5.32805 | 5.82603 |
| View angle | 39.1923 | 24.4350 | 14.5434 |
| Image height | 10.8150 | 10.8150 | 10.8150 |
| Overall length of lens system | 72.3753 | 72.3776 | 72.3791 |
| BF | 14.25090 | 14.25308 | 14.25445 |
| d5 | 0.4955 | 6.5745 | 12.0832 |
| d11 | 14.8795 | 8.8006 | 3.2922 |
| d14 | 10.1503 | 4.3836 | 0.5288 |
| d19 | 2.6746 | 7.9120 | 10.9831 |
| d21 | 2.7349 | 3.2642 | 4.0478 |
| Entrance pupil position | 18.2761 | 31.8846 | 48.8197 |
| Exit pupil position | −22.5907 | −22.4465 | −22.8068 |
| Front principal points position | 27.0826 | 39.7807 | 41.3489 |
| Back principal points position | 57.8120 | 47.1772 | 28.9435 |

Zoom lens unit data

| Lens unit | Initial surface No. | Focal length | Overall length of lens unit | Front principal points position | Back principal points position |
|---|---|---|---|---|---|
| 1 | 1 | 39.56083 | 8.09550 | 0.08748 | 3.55907 |
| 2 | 6 | −11.00999 | 7.41310 | 0.24847 | 1.65575 |
| 3 | 12 | 34.41585 | 1.83120 | 1.02398 | 1.46573 |
| 4 | 15 | 47.70999 | 6.41160 | −9.99871 | −4.92335 |
| 5 | 20 | 35.05857 | 2.08440 | 1.26995 | 2.03613 |
| 6 | 22 | −60.63726 | 1.35380 | 1.07939 | 1.55261 |

TABLE 8

(Various data in a close-object in-focus condition)
Zooming ratio 2.11942

| | Wide-angle limit | Middle position | Telephoto limit |
|---|---|---|---|
| Focal length | 14.4530 | 21.0050 | 30.6320 |
| F-number | 3.70366 | 5.21659 | 5.88411 |
| View angle | 39.1227 | 27.7098 | 18.2785 |
| Image height | 10.8150 | 10.8150 | 10.8150 |
| Overall length of lens system | 72.3757 | 72.3771 | 72.3791 |
| BF | 14.25118 | 14.25264 | 14.25441 |
| d5 | 0.4955 | 5.1380 | 9.3511 |
| d11 | 14.8795 | 10.2371 | 6.0243 |
| d14 | 9.2886 | 5.3721 | 0.5289 |
| d19 | 3.0743 | 5.4986 | 8.0003 |
| d21 | 3.1970 | 4.6891 | 7.0305 |
| Entrance pupil position | 18.2761 | 28.2288 | 39.8366 |
| Exit pupil position | −22.0493 | −20.8923 | −20.1800 |
| Front principal points position | 26.8317 | 35.9868 | 39.6276 |
| Back principal points position | 57.0427 | 49.5337 | 37.7371 |

Numerical Example 3

The zoom lens system of Numerical Example 3 corresponds to Embodiment 3 shown in FIGS. 9A-9C. Table 9 shows the surface data of the zoom lens system of Numerical Example 3. Table 10 shows the aspherical data. Table 11 shows various data in an infinity in-focus condition. Table 12 shows various data in a close-object in-focus condition.

TABLE 9

(Surface data)

| Surface number | r | d | nd | vd |
|---|---|---|---|---|
| Object surface | ∞ | | | |
| 1 | 284.23350 | 1.00000 | 1.84666 | 23.8 |
| 2 | 58.68740 | 4.20050 | 1.54982 | 64.7 |
| 3 | −70.03340 | 0.10000 | | |
| 4* | 21.56130 | 4.08630 | 1.49964 | 69.1 |
| 5 | −520.84440 | Variable | | |
| 6 | −815.59620 | 0.70000 | 1.72916 | 54.7 |
| 7 | 13.16760 | 4.17600 | | |
| 8* | −15.05660 | 0.70000 | 1.74993 | 45.4 |
| 9 | 25.49950 | 2.52320 | 1.84666 | 23.8 |
| 10 | −36.15830 | Variable | | |
| 11(Diaphragm) | ∞ | 0.50000 | | |
| 12* | 8.11410 | 4.41410 | 1.67251 | 51.9 |
| 13* | 2562.39940 | 0.10000 | | |
| 14 | 30.53680 | 0.70000 | 1.74240 | 30.4 |
| 15 | 5.55800 | 1.54230 | 1.72364 | 54.9 |
| 16 | 10.00470 | Variable | | |
| 17 | −21.30850 | 0.82870 | 1.72412 | 36.9 |
| 18 | −86.62010 | 1.52300 | 1.48749 | 70.4 |
| 19 | −46.87880 | 0.44060 | | |

TABLE 9-continued (Surface data)

| Surface number | r | d | nd | vd |
|---|---|---|---|---|
| 20* | 51.55490 | 3.02260 | 1.72293 | 54.9 |
| 21 | −33.10420 | (BF) | | |
| Image surface | ∞ | | | |

TABLE 10

(Aspherical data)

Surface No. 4

K = 0.00000E+00, A4 = −2.03822E−06, A6 = −4.32333E−08, A8 = 3.36354E−10 A10 = −1.61645E−12

Surface No. 8

K = −1.00138E+00, A4 = −1.59898E−05, A6 = −6.99543E−07, A8 = 1.49743E−08 A10 = −1.49297E−10

Surface No. 12

K = 0.00000E+00, A4 = 1.10586E−04, A6 = 5.15005E−06, A8 = 1.47279E−07 A10 = 9.63835E−11

Surface No. 13

K = 0.00000E+00, A4 = 5.88832E−04, A6 = 1.68294E−05, A8 = −7.98898E−08 A10 = 3.71724E−08

Surface No. 20

K = 0.00000E+00, A4 = −1.47283E−05, A6 = 2.33757E−07, A8 = −3.27684E−09 A10 = 1.61999E−11

TABLE 11

(Various data in an infinity in-focus condition)

Zooming ratio 2.81302

| | Wide-angle limit | Middle position | Telephoto limit |
|---|---|---|---|
| Focal length | 17.5046 | 29.3570 | 49.2408 |
| F-number | 4.63913 | 5.53680 | 5.95737 |
| View angle | 34.1342 | 19.9553 | 11.8415 |
| Image height | 10.8150 | 10.8150 | 10.8150 |
| Overall length of lens system | 70.1939 | 70.1923 | 70.2047 |
| BF | 16.36381 | 18.68936 | 16.37450 |
| d5 | 0.4000 | 4.2933 | 8.8469 |
| d10 | 16.4817 | 8.0591 | 1.0000 |
| d16 | 6.3911 | 8.5932 | 13.4260 |
| Entrance pupil position | 22.0062 | 28.5662 | 36.6128 |
| Exit pupil position | −20.3242 | −25.0879 | −37.8235 |
| Front principal points position | 31.1590 | 38.2364 | 41.1165 |
| Back principal points position | 52.6893 | 40.8352 | 20.9639 |

Zoom lens unit data

| Lens unit | Initial surface No. | Focal length | Overall length of lens unit | Front principal points position | Back principal points position |
|---|---|---|---|---|---|
| 1 | 1 | 33.38887 | 9.38680 | 3.54630 | 6.85679 |
| 2 | 6 | −12.60848 | 8.09920 | 0.94385 | 2.59059 |
| 3 | 11 | 19.06783 | 7.25640 | −3.90499 | 0.46141 |
| 4 | 17 | 56.12476 | 5.81490 | 6.90352 | 9.56659 |

TABLE 12

(Various data in a close-object in-focus condition)
Zooming ratio 1.51508

|  | Wide-angle limit | Middle position | Telephoto limit |
|---|---|---|---|
| Focal length | 22.7532 | 28.6428 | 34.4730 |
| F-number | 5.07689 | 5.50918 | 5.66261 |
| View angle | 25.5966 | 19.6513 | 15.9782 |
| Image height | 10.8150 | 10.8150 | 10.8150 |
| Overall length of lens system | 70.1921 | 70.1938 | 70.1970 |
| BF | 19.65176 | 21.96804 | 23.57976 |
| d5 | 2.0218 | 4.6189 | 6.4580 |
| d10 | 11.4142 | 7.8809 | 4.9887 |
| d16 | 6.5470 | 5.1687 | 4.6132 |
| Entrance pupil position | 24.0968 | 29.4484 | 33.0391 |
| Exit pupil position | −20.6438 | −17.9034 | −16.8510 |
| Front principal points position | 33.6708 | 36.6462 | 36.2902 |
| Back principal points position | 46.4255 | 39.9361 | 33.3557 |

FIGS. 2A-2C, 6A-6C, and 10A-10C are longitudinal aberration diagrams of an infinity in-focus condition of the zoom lens systems according to Numerical Examples 1 to 3, respectively.

FIGS. 3A-3C, 7A-7C, and 11A-11C are longitudinal aberration diagrams of a close-object in-focus condition of the zoom lens systems according to Numerical Examples 1 to 3, respectively. The object distance is 325 mm in Numerical Example 1, 297 mm in Numerical Example 2, or 570 mm in Numerical Example 3.

In each longitudinal aberration diagram, FIGS. 2A, 3A, 6A, 7A, 10A, and 11A shows the aberration at a wide-angle limit, FIGS. 2B, 3B, 6B, 7B, 10B, and 11B shows the aberration at a middle position, and FIGS. 2C, 3C, 6C, 7C, 10C, and 11 C shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each FIG., indicated as F), and the solid line, the short dash line and the long dash line indicate the characteristics to the d-line, the F-line and the C-line, respectively. In each astigmatism diagram, the vertical axis indicates the image height (in each FIG., indicated as H), and the solid line and the dash line indicate the characteristics to the sagittal plane (in each FIG., indicated as "s") and the meridional plane (in each FIG., indicated as "m"), respectively. In each distortion diagram, the vertical axis indicates the image height (in each FIG., indicated as H).

Figure 4:
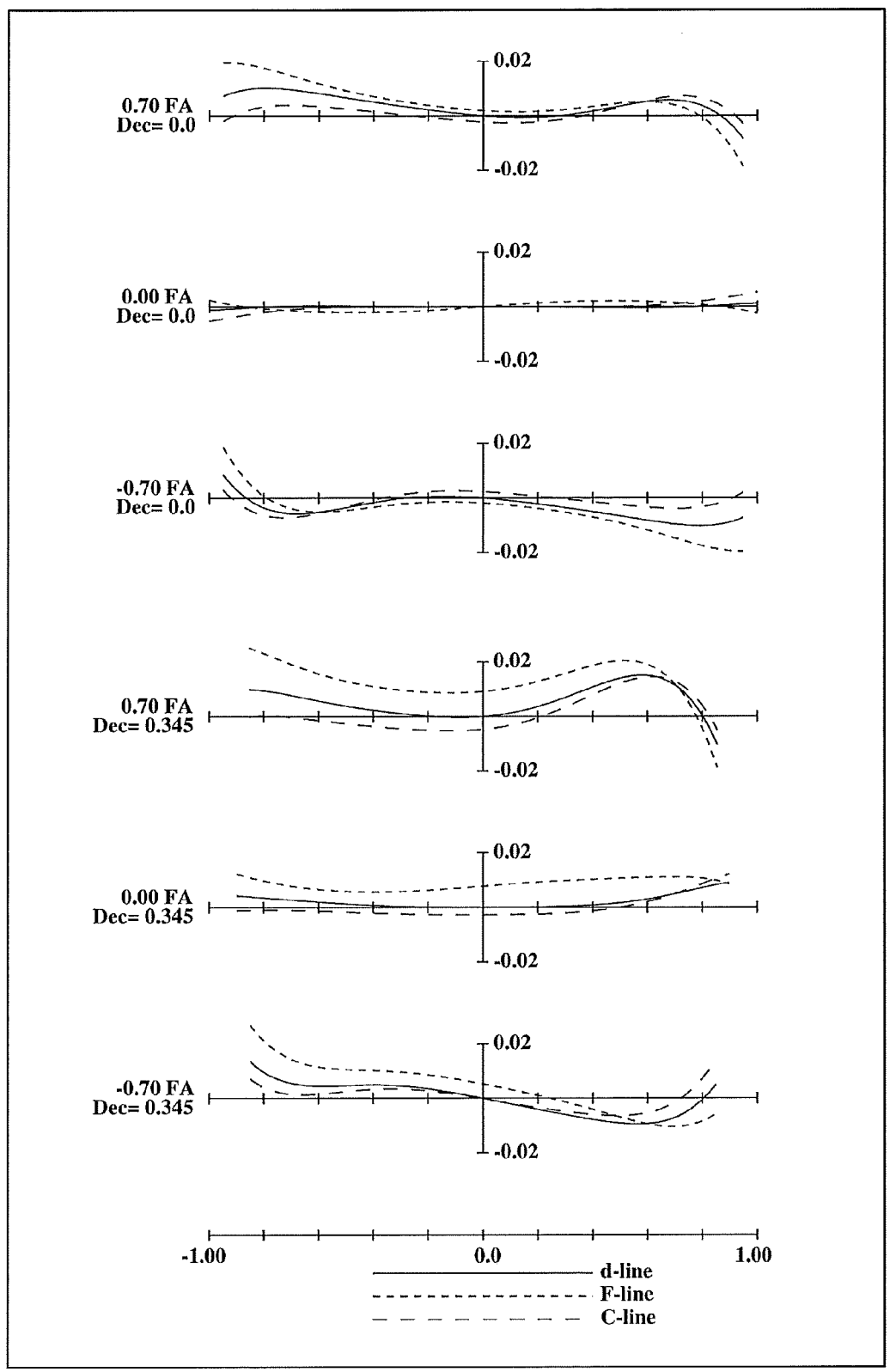
FIG. 4 is a lateral aberration diagram of the zoom lens system according to Numerical Example 1 at a telephoto limit in a basic state where image blur compensation is not performed and in an image blur compensation state.
Figure 8:
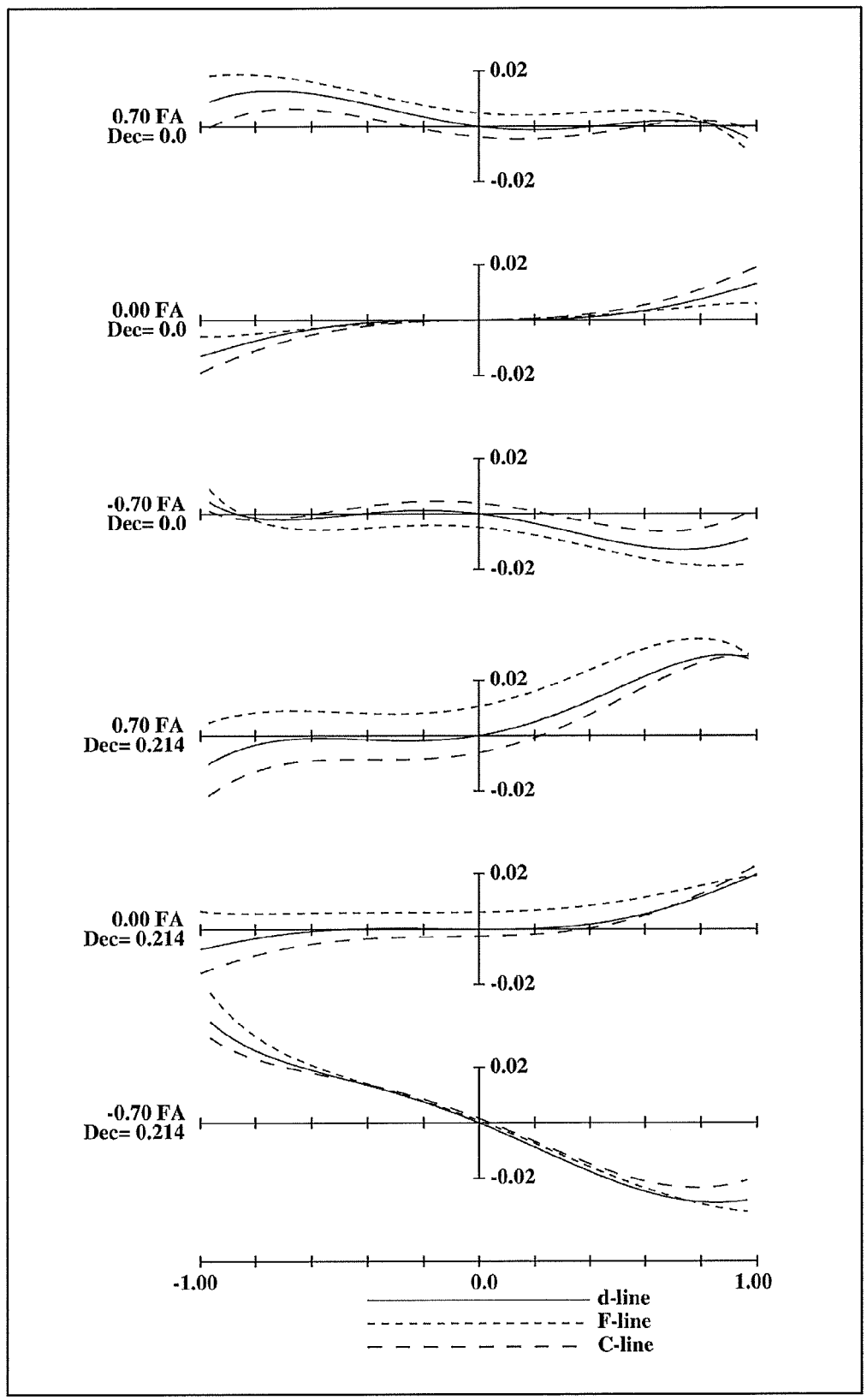
FIG. 8 is a lateral aberration diagram of the zoom lens system according to Numerical Example 2 at a telephoto limit in a basic state where image blur compensation is not performed and in an image blur compensation state.
Figure 12:
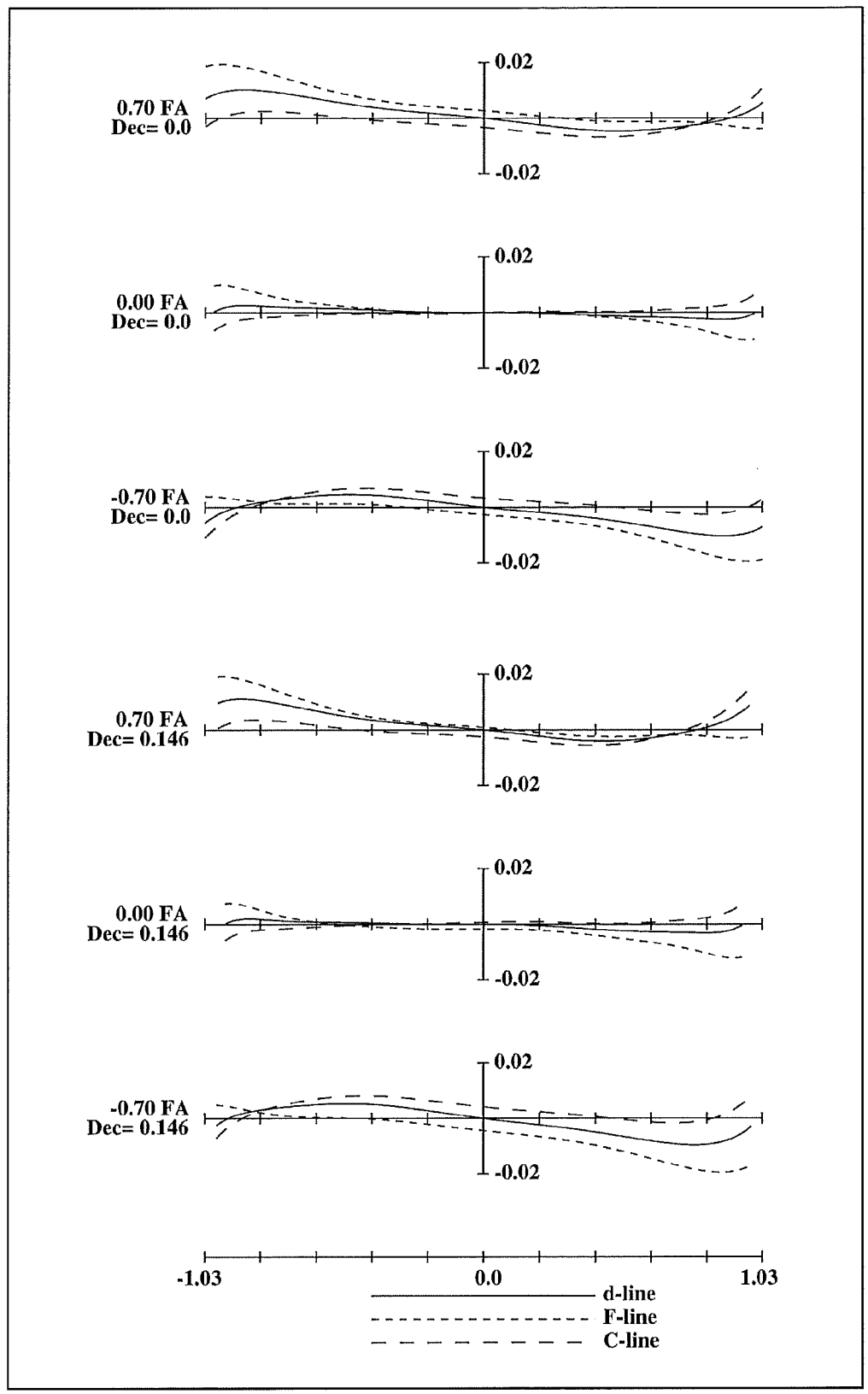
FIG. 12 is a lateral aberration diagram of the zoom lens system according to Numerical Example 3 at a telephoto limit in a basic state where image blur compensation is not performed and in an image blur compensation state.

FIGS. 4, 8, and 12 are lateral aberration diagrams of the zoom lens systems at a telephoto limit according to Numerical Examples 1 to 3, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit (Numerical Example 1: the fifth lens element L5 in the third lens unit G3, Numerical Example 2: the sixth lens element L6 in the third lens unit G3, Numerical Example 3: the seventh lens element L7, the eighth lens element L8 and the ninth lens element L9 in the third lens unit G3) is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3.

In the zoom lens system according to each Numerical Example, the amount of movement of the image blur compensating lens unit in a direction perpendicular to the optical axis in the image blur compensation state at a telephoto limit is as follows.

Numerical Example 1 0.345 mm
Numerical Example 2 0.214 mm
Numerical Example 3 0.146 mm Here, in an infinity in-focus condition at a telephoto limit, the amount of image decentering in a case that the zoom lens system inclines by 0.3° is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

The following Table 13 shows the corresponding values to the individual conditions in the zoom lens systems of each of Numerical Examples.

TABLE 13

(Values corresponding to conditions)

|  |  | Numerical Example | | |
|---|---|---|---|---|
|  | Condition | 1 | 2 | 3 |
| (1) | $|d_{2T}/d_{1T}|$ | 0.1214 | 0.0000 | 0.6702 |
| (2) | $|d_{1W}/d_{2W}|$ | 0.8337 | 0.0000 | 0.4707 |
| (3) | $f_1/f_W$ | −0.7444 | −0.7652 | −0.7202 |
| (4) | $f_2/f_W$ | 1.7707 | 3.2755 | 1.0893 |
|  | $d_{1T}$ | −1.2148 | −2.7321 | −2.3882 |
|  | $d_{2T}$ | 0.1475 | 0.0001 | 1.6005 |

TABLE 13-continued (Values corresponding to conditions)

| Condition | Numerical Example | | |
|---|---|---|---|
| | 1 | 2 | 3 |
| $d_{1W}$ | 0.9458 | 0.0000 | 1.6218 |
| $d_{2W}$ | −1.1344 | −0.8621 | −3.4457 |
| $f_{1f}$ | −10.8609 | −11.0100 | −12.6032 |
| $f_{2f}$ | 25.8367 | 47.6910 | 19.0629 |
| $f_W$ | 14.5911 | 14.5600 | 17.5000 |

The zoom lens systems disclosed herein are applicable to a digital still camera, a digital video camera, a camera for a mobile telephone, a camera for a PDA (Personal Digital Assistance), a surveillance camera in a surveillance system, a Web camera, a vehicle-mounted camera or the like. In particular, the zoom lens systems disclosed herein are suitable for a photographing optical system where high image quality is required like in a digital still camera system or a digital video camera system.

Also, the zoom lens systems disclosed herein are applicable to, among the interchangeable lens apparatuses according to the present invention, an interchangeable lens apparatus with which a digital video camera system is provided, or an interchangeable lens apparatus having motorized zoom function, i.e., activating function for the zoom lens system by a motor.

Although the present invention has been fully described, such description is merely an example of the present invention in every way and does not set a limit to the scope of the present invention. It is to be understood that various changes and modifications can be achieved unless such changes and modification depart from the scope of the present invention.

What is claimed is:

1. A zoom lens system which comprises a plurality of lens units, and performs zooming from a wide-angle limit to a telephoto limit, and focusing from an infinity in-focus condition to a close-object in-focus condition, wherein
the plurality of lens units include:
a first lens unit having positive optical power;
a first focusing lens unit which is located on an image side relative to the first lens unit, has negative optical power, and moves along an optical axis in the zooming and the focusing; and
a second focusing lens unit which is located on the image side relative to the first focusing lens unit, has positive optical power, and moves along the optical axis in the zooming and the focusing, and
the following condition (1) is satisfied:

$$|d_{2T}/d_{1T}|<1.0 \qquad (1)$$

where
$d_{1T}$ is an amount of movement of the first focusing lens unit in focusing at a telephoto limit, and
$d_{2T}$ is an amount of movement of the second focusing lens unit in focusing at a telephoto limit, wherein the first lens unit has a constant distance from an image surface in both the zooming and the focusing.

2. The zoom lens system as claimed in claim 1, wherein the following condition (2) is satisfied:

$$|d_{1W}/d_{2W}|<1.0 \qquad (2)$$

where
$d_{1W}$ is an amount of movement of the first focusing lens unit in focusing at a wide-angle limit, and
$d_{2W}$ is an amount of movement of the second focusing lens unit in focusing at a wide-angle limit.

3. The zoom lens system as claimed in claim 1, wherein the first lens unit is located closest to an object side among the plurality of lens units,
the first focusing lens unit is the second closest to the object side among the plurality of lens units, and
the second focusing lens unit is the fourth closest to the object side among the plurality of lens units.

4. The zoom lens system as claimed in claim 1, wherein the following conditions (3) and (4) are satisfied:

$$-1.5<f_{1f}/f_W<-0.35 \qquad (3)$$

$$0.5<f_{2f}/f_W<5.0 \qquad (4)$$

where
$f_{1f}$ is a focal length of the first focusing lens unit,
$f_{2f}$ is a focal length of the second focusing lens unit, and
$f_W$ is a focal length of the entire zoom lens system at a wide-angle limit.

5. The zoom lens system as claimed in claim 1, wherein a lens unit, which is the third closest to an object side among the plurality of lens units, moves in a direction perpendicular to the optical axis to cause the position of an image to shift in the direction perpendicular to the optical axis.

6. A lens barrel comprising:
a zoom lens system as claimed in claim 1; and
a holder section for holding the zoom lens system.

7. An interchangeable lens apparatus comprising:
a lens barrel as claimed in claim 6; and
a mount which is detachably connected to a camera body.

8. A camera system comprising:
an interchangeable lens apparatus as claimed in claim 7; and
an image sensor which receives an optical image formed by the zoom lens system, and converts the optical image into an electric image signal.

9. A camera system comprising:
a lens barrel as claimed in claim 6; and
an image sensor which receives an optical image formed by the zoom lens system, and converts the optical image into an electric image signal.

* * * * *